(12) United States Patent
Guichard et al.

(10) Patent No.: US 7,693,047 B2
(45) Date of Patent: Apr. 6, 2010

(54) SYSTEM AND METHOD FOR PE-NODE PROTECTION

(75) Inventors: James Guichard, Groton, MA (US); Jean-Philippe Vasseur, Dunstable, MA (US); Clarence Filsfils, Brussels (BE); Peter De Vriendt, Denderleeuw (BE)

(73) Assignee: Cisco Technology, Inc., San Jose, CA (US)

( * ) Notice: Subject to any disclaimer, the term of this patent is extended or adjusted under 35 U.S.C. 154(b) by 925 days.

(21) Appl. No.: 11/287,801

(22) Filed: Nov. 28, 2005

(65) Prior Publication Data

US 2007/0121486 A1 May 31, 2007

(51) Int. Cl.
*G01R 31/08* (2006.01)
*H04L 12/28* (2006.01)

(52) U.S. Cl. .................. 370/217; 370/219; 370/221; 370/242; 370/392

(58) Field of Classification Search .......... 370/216, 370/217, 225–228, 242, 248, 395.3, 238, 370/392, 401
See application file for complete search history.

(56) References Cited

U.S. PATENT DOCUMENTS

| | | | |
|---|---|---|---|
| 6,628,649 B1 | 9/2003 | Raj et al. | |
| 6,751,190 B1 | 6/2004 | Swallow | |
| 6,778,492 B2 | 8/2004 | Charny et al. | |
| 6,831,898 B1 | 12/2004 | Edsall et al. | |
| 6,850,486 B2 | 2/2005 | Saleh et al. | |
| 7,082,101 B2* | 7/2006 | Kim et al. | 370/225 |
| 7,093,027 B1* | 8/2006 | Shabtay et al. | 709/239 |
| 7,406,032 B2* | 7/2008 | Li et al. | 370/217 |
| 7,477,593 B2* | 1/2009 | Scudder et al. | 370/217 |
| 2002/0112072 A1* | 8/2002 | Jain | 709/239 |
| 2003/0126287 A1 | 7/2003 | Charny et al. | |
| 2003/0233595 A1 | 12/2003 | Charny et al. | |
| 2004/0052207 A1* | 3/2004 | Charny et al. | 370/216 |
| 2004/0081085 A1* | 4/2004 | De Cnodder et al. | 370/225 |
| 2004/0090913 A1 | 5/2004 | Scudder et al. | |
| 2004/0114595 A1* | 6/2004 | Doukai | 370/389 |
| 2004/0196827 A1* | 10/2004 | Xu et al. | 370/352 |
| 2005/0097219 A1 | 5/2005 | Goguen et al. | |
| 2005/0111351 A1* | 5/2005 | Shen | 370/217 |
| 2006/0013210 A1* | 1/2006 | Bordogna et al. | 370/389 |

OTHER PUBLICATIONS

Radia Perlman, "Interconnections Second Edition:Bridges, Routers, Switches, and Internetworking Protocols", Chapter 9 pp. 189-220, Addison Wesley Longman, Inc., 2000.

(Continued)

*Primary Examiner*—Kwang B Yao
*Assistant Examiner*—Candal Elpenord
(74) *Attorney, Agent, or Firm*—Cesari and McKenna, LLP

(57) ABSTRACT

A novel fast reroute (FRR) technique is provided for quickly and efficiently rerouting selected types of network traffic in response to a node or link failure at the edge of a computer network. According to the technique, the network includes first and second edge devices that function as "FRR mates," such that network traffic originally destined for one FRR mate may be quickly rerouted to the other without having to wait for conventional network convergence. When an edge device receives rerouted packets originally destined for its FRR mate, the device responds by forwarding only those rerouted packets matching the selected traffic types; rerouted packets that do not match the selected traffic types are dropped or otherwise discarded. The first and second edge devices may be statically configured as FRR mates, e.g., by a network administrator, or they may be configured to automatically detect their compatibility as FRR mates.

19 Claims, 14 Drawing Sheets

OTHER PUBLICATIONS

Radia Perlman, "Interconnections Second Edition: Bridges Routers, Switches, and Internetworking Protocols" Sections 12.1-12.3 pp. 299-324, Addison Wesley Longman, Inc., 2000.

Y. Rekhter et al., "A Border Gateway Protocol 4 (BGP-4)", Request for Comments 1771, Mar. 1995.

Andrew S. Tanenbaum, "Computer Networks" Fourth Edition, Section 1.4.2 pp. 41-44, Pearson Education, Inc., 2003.

Stephen A Thomas, "IP Switching and Routing Essentials: Understanding RIP, OSPF, BGP, MPLS, CR-LDP, and RSVP-TE" Chapter 7 pp. 221-243, John Wiley & Sons, Inc., 2002.

Ivan Pepelnjak et al., "MOLS and VPN Architectures" Chapters 8-9 pp. 145-205, Cisco Press 2001.

E Rosen et al., "BGP/MPLS VPNs" Request for Comments 2547 Mar. 1999.

Stephen A. Thomas, "IP Switching and Routing Essentials: Understanding RIP, OSPF, BGP, MPLS, CR-LDP, and RSVP-TE" Chapter 8 pp. 245-281, John Wiley & Sons, Inc., 2002.

* cited by examiner

LABEL FORWARDING TABLE 500

| INGRESS IGP LABEL 502 | EGRESS NETWORK INTERFACE 504 | INGRESS IGP LABEL 506 | OTHER INFORMATION 508 |
|---|---|---|---|
| 57 | 1 | — | |
| 72 | 2 | 101 | |

510a → (row 1)
510b → (row 2)

FIG. 5

PRIMARY LABEL TABLE 700

| EGRESS NETWORK INTERFACE 702 | BACKUP-PE-DEVICE NETWORK INTERFACE 704 | LABEL STACK (IGP, PRIMARY) 706 | OTHER INFORMATION 708 |
|---|---|---|---|
| 1 | 2 | 101,7 | |
| | | | |

"RED" VRF TABLE 1100

| ADDRESS PREFIX 1102 | ADVERTISING PE DEVICE 1104 | VPN LABEL 1106 | OTHER INFORMATION 1108 |
|---|---|---|---|
| 10.1.0.0 /16 | PE2 | 9 | |
| 10.1.0.0 /16 | PE1 | 5 | |
| 10.2.0.0 /16 | PE3 | 17 | |
| | | | |

SYSTEM AND METHOD FOR PE-NODE PROTECTION

FIELD OF THE INVENTION

This invention relates generally to routing data between private routing domains, and, more specifically, to a fast reroute (FRR) technique that quickly and efficiently reroutes network traffic to a neighboring exit point in the event of a node failure.

BACKGROUND OF THE INVENTION

A computer network is a geographically distributed collection of interconnected subnetworks, such as local area networks (LAN) that transport data between network nodes. As used herein, a network node is any device adapted to send and/or receive data in the computer network. Thus, in this context, "node" and "device" may be used interchangeably. The network topology is defined by an arrangement of network nodes that communicate with one another, typically through one or more intermediate nodes, such as routers and switches. In addition to intra-network communications, data also may be exchanged between neighboring (i.e., adjacent) networks. To that end, "edge devices" located at the logical outer-bound of the computer network may be adapted to send and receive inter-network communications. Both inter-network and intra-network communications are typically effected by exchanging discrete packets of data according to predefined protocols. In this context, a protocol consists of a set of rules defining how network nodes interact with each other. The term "network traffic" generally refers to the transmission of one or more data packets between network nodes in the computer network.

Each data packet typically comprises "payload" data prepended ("encapsulated") by at least one network header formatted in accordance with a network communication protocol. The network headers include information that enables network nodes to efficiently route the packet through the computer network. Often, a packet's network headers include a data-link (layer 2) header, an internetwork (layer 3) header and a transport (layer 4) header as defined by the Transmission Control Protocol/Internet Protocol (TCP/IP) Reference Model. The TCP/IP Reference Model is generally described in more detail in Section 1.4.2 of the reference book entitled *Computer Networks, Fourth Edition*, by Andrew Tanenbaum, published 2003, which is hereby incorporated by reference as though fully set forth herein.

A data packet may originate at a source node and subsequently "hop" from node to node along a logical data path until it reaches its addressed destination node. The network addresses defining the logical data path of a data flow are typically stored as Internet Protocol (IP) addresses in the packet's internetwork header. IP addresses are typically formatted in accordance with the IP Version 4 (IPv4) protocol, in which network nodes are addressed using 32 bit (four byte) values. Specifically, the IPv4 addresses are denoted by four numbers between 0 and 255, each number usually delineated by a "dot." A subnetwork may be assigned to an IP address space containing a predetermined range of IPv4 addresses. For example, an exemplary subnetwork may be allocated the address space 128.0.10.*, where the asterisk is a wildcard that can differentiate up to 254 individual nodes in the subnetwork (0 and 255 are reserved values). For instance, a first node in the subnetwork may be assigned to the IP address 128.0.10.1, whereas a second node may be assigned to the IP address 128.0.10.2.

A subnetwork is associated with a subnet mask that may be used to select a set of contiguous high-order bits from IP addresses within the subnetwork's allotted address space. A subnet mask length indicates the number of contiguous high-order bits selected by the subnet mask, and a subnet mask length of N bits is hereinafter represented as /N. The subnet mask length for a given subnetwork is typically selected based on the number of bits required to distinctly address nodes in that subnetwork. Subnet masks and their uses are more generally described in Chapter 9 of the reference book entitled *Interconnections Second Edition*, by Radia Perlman, published January 2000, which is hereby incorporated by reference as though fully set forth herein.

By way of example, assume an exemplary subnetwork is assigned the IP address space 128.0.10.4, and the subnetwork contains two addressable (reachable) network nodes. In this case, 30 address bits are needed to identify the subnetwork 128.0.10.4, and the remaining two address bits are used to distinctly address either of the two nodes in the subnetwork. Thus, the subnetwork may be associated with a subnet mask length of /30 since only the first 30 most-significant bits of an IP address are required to uniquely address this subnetwork. As used herein, an "address prefix" is defined as the result of applying a subnet mask to a network address. For example, consider the address prefix 128.0.10.1/24. In this case, a network portion of the prefix contains the 24 most-significant bits of the IP address 128.0.10.1, i.e., the network is 128.0.10.0, and the last 8 bits are used to identify hosts on that network. An IP address and an address prefix are said to "match" when the prefix's network portion equals the IP address's most-significant bits.

Interior Gateway Protocols

A computer network may contain smaller groups of one or more subnetworks which may be managed as separate routing domains. As used herein, a routing domain is broadly construed as a collection of interconnected network nodes under a common administration. A routing domain is often managed by a single administrative entity, such as a company, an academic institution or a branch of government. Such a centrally-managed routing domain is sometimes referred to as an "autonomous system." In general, a routing domain may operate as an enterprise network, a service provider or any other type of network or subnetwork. Further, the routing domain may contain one or more edge devices having "peer" connections to edge devices in adjacent routing domains.

Network nodes in a routing domain are typically configured to forward data using predetermined paths from "interior gateway" routing protocols, such as conventional link-state protocols and distance-vector protocols. These interior gateway protocols (IGP) define the manner with which routing information and network-topology information are exchanged and processed in the routing domain. For instance, IGP protocols typically provide a mechanism for distributing a set of reachable IP subnetworks among the intermediate nodes in the routing domain. As such, each intermediate node receives a consistent "view" of the domain's topology. Examples of link-state and distance-vectors protocols known in the art, such as the Open Shortest Path First (OSPF) protocol and Routing Information Protocol (RIP), are described in Sections 12.1-12.3 of the reference book entitled *Interconnections, Second Edition*, by Radia Perlman, published January 2000, which is hereby incorporated by reference as though fully set forth herein.

The Border Gateway Protocol (BGP) is usually employed as an "external gateway" routing protocol for routing data between autonomous systems. The BGP protocol is well known and generally described in Request for Comments (RFC) 1771, entitled *A Border Gateway Protocol 4 (BGP-4)*, by Y. Rekhter et al., published March 1995, which is publicly available through the Internet Engineering Task Force (IETF) and is hereby incorporated by reference in its entirety. A variation of the BGP protocol, known as internal BGP (iBGP), is often used to distribute inter-network reachability information (address prefixes) among BGP-enabled edge devices in a routing domain. To implement iBGP, the edge devices must be "fully meshed," i.e., such that every device is coupled to every other device by way of a TCP connection. In practice, conventional route reflectors are used to logically couple devices into a full mesh. The BGP protocol also may be extended for compatibility with services other than standard Internet connectivity. For instance, Multi-Protocol BGP (MP-BGP) supports various address family identifier (AFI) fields that permit BGP messages to transport multi-protocol information, such as is the case with RFC 2547 services.

A network node in a routing domain may detect a change in the domain's topology. For example, the node may become unable to communicate with one of its neighboring nodes, e.g., due to a link failure between the nodes or the neighboring node failing, such as losing power or going "off line" for repairs. If the detected node or link failure occurred within the routing domain, the detecting node may advertise the intra-domain topology change to other nodes in the domain using an interior gateway protocol, such as OSPF. Similarly, if an edge device detects a node or link failure that prevents communications with a neighboring routing domain, the edge device may disseminate the inter-domain topology change to its other fully-meshed edge devices, e.g., using the iBGP protocol. In either case, there is an inherent latency of propagating the network-topology change within the routing domain and having nodes in the domain converge on a consistent view of the new network topology, i.e., without the failed node or link.

Multi-Protocol Label Switching/Virtual Private Network Architecture

A virtual private network (VPN) is a collection of network nodes that establish private communications over a shared backbone network. Previously, VPNs were implemented by embedding private leased lines in the shared network. The leased lines (i.e., communication links) were reserved only for network traffic among those network nodes participating in the VPN. Today, the above-described VPN implementation has been mostly replaced by private "virtual circuits" deployed in public networks. Specifically, each virtual circuit defines a logical end-to-end data path between a pair of network nodes participating in the VPN. When the pair of nodes is located in different routing domains, edge devices in a plurality of interconnected routing domains may have to co-operate to establish the nodes' virtual circuit.

A virtual circuit may be established using, for example, conventional layer-2 Frame Relay (FR) or Asynchronous Transfer Mode (ATM) networks. Alternatively, the virtual circuit may "tunnel" data between its logical end points using known layer-2 and/or layer-3 tunneling protocols, such as the Layer-2 Tunneling Protocol (L2TP) and the Generic Routing Encapsulation (GRE) protocol. In this case, one or more tunnel headers are prepended to a data packet to appropriately route the packet along the virtual circuit. The Multi-Protocol Label Switching (MPLS) protocol may be used as a tunneling mechanism for establishing layer-2 virtual circuits or layer-3 network-based VPNs through an IP network.

MPLS enables network nodes to forward packets along predetermined "label switched paths" (LSP). Each LSP defines a logical data path, or virtual circuit, between a pair of source and destination nodes; the set of network nodes situated along the LSP may be determined using reachability information provided by conventional interior gateway protocols, such as OSPF. Unlike traditional IP routing, where node-to-node ("next hop") forwarding decisions are performed based on destination IP addresses, MPLS-configured nodes instead forward data packets based on "label" values (or "tag" values) added to the IP packets. As such, a MPLS-configured node can perform a label-lookup operation to determine a packet's next-hop destination. MPLS traffic engineering provides additional advantages over IP-based routing, such as enabling MPLS-configured nodes to reserve network resources, such as bandwidth, to ensure a desired quality of service (QoS).

Each destination represented via a LSP is associated with a locally allocated label value at each hop of the LSP, such that the locally allocated label value is carried by data packets forwarded over its associated hop. The MPLS label values are typically distributed among the LSP's nodes using, e.g., the Label Distribution Protocol (LDP), Resource Reservation Protocol (RSVP) or MP-BGP protocol. Operationally, when a data packet is received at a MPLS-configured node, the node extracts the packet's transported label value, e.g., stored at a known location in the packet's encapsulating headers. The extracted label value is used to identify the next network node ("next hop") to forward the is packet. Typically, an IGP label identifies the packet's next hop within a routing domain, and a VPN label identifies the packet's next hop across routing domains. More generally, the IGP label may be a MPLS label or any other encapsulation header used to identify the packet's next hop in the routing domain.

The packet may contain a "stack" of labels such that the stack's top-most label determines the packet's next-hop destination. After receiving the packet, the MPLS-configured node "pops" (removes) the packet's top-most label from the label stack and performs a label-lookup operation to determine the packet's next-hop destination. Then, the node "pushes" (inserts) a new label value associated with the packet's next hop onto the top of the stack and forwards the packet to its next destination. This process is repeated for every logical hop along the LSP until the packet reaches its destination node. The above-described MPLS operation is described in more detail in Chapter 7 of the reference book entitled *IP Switching and Routing Essentials*, by Stephen Thomas, published 2002, which is hereby incorporated by reference as though fully set forth herein.

Layer-3 network-based VPN services that utilize MPLS technology are often deployed by network service providers for one or more customer sites. These networks are typically said to provide "MPLS/VPN" services. As used herein, a customer site is broadly defined as a routing domain containing at least one customer edge (CE) device coupled to a provider edge (PE) device in the service provider's network ("provider network"). The customer site may be multi-homed to the provider network, i.e., wherein one or more of the customer's CE devices is coupled to a plurality of PE devices in the provider network. The PE and CE devices are generally intermediate network nodes, such as routers or switches, located at the edge of their respective networks. The PE-CE data links may be established over various physical mediums, such as conventional wire links, optical links, wireless links, etc., and may communicate data formatted using various network communication protocols including ATM, Frame Relay, Ethernet, Fibre Distributed Data Interface (FDDI), etc. In addition, the PE and CE devices may be configured to exchange routing information over their respective PE-CE links in accordance with various interior and exterior gateway protocols, such as BGP, OSPF, RIP, etc.

In the traditional MPLS/VPN network architecture, each customer site may participate in one or more different VPNs. Most often, each customer site is associated with a single VPN, and hereinafter the illustrative embodiments will assume a one-to-one correspondence between customer sites and VPNs. For example, customer sites owned or managed by a common administrative entity, such as a corporate enterprise, may be statically assigned to the enterprise's VPN. As such, network nodes situated in the enterprise's various customer sites participate in the same VPN and are therefore permitted to securely communicate with one another via the provider network. In other words, the provider network establishes the necessary LSPs to interconnect the customer sites participating in the enterprise's VPN. Likewise, the provider network also may establish LSPs that interconnect customer sites participating in other VPNs. This widely-deployed MPLS/VPN architecture is generally described in more detail in Chapters 8-9 of the reference book entitled *MPLS and VPN Architecture, Volume* 1, by I. Pepelnjak et al., published 2001 and in the IETF publication RFC 2547, entitled *BGP/MPLS VPNs*, by E. Rosen et al., published March 1999, each of which is hereby incorporated by reference as though fully set forth herein.

FIG. 1 illustrates an exemplary MPLS/VPN network 100 containing a provider network 110 coupled to neighboring customer sites 120 and 140. The provider network includes a plurality of PE devices 130, including devices PE1 130*a*, PE2 130*b* and PE3 130*c*. The PE devices are fully meshed at the BGP level. That is, each PE device in the provider network can communicate with every other PE device (either directly or by means of BGP route reflectors). The network 110 also contains "core" provider (P) devices 135*a* and 135*b*, such as routers, which are respectively labeled P1 and P2. These P devices may be used to establish label switched paths between pairs of PE devices. For example, the provider device P1 may be used to establish a first LSP1 between PE3 and PE1, and the device P2 may be used to establish a second LSP2 between PE3 and PE2.

Each neighboring customer site contains one or more CE devices attached to PE devices in the provider network 110. For instance, the customer site 120 contains CE devices 160 and 165 (labeled CE1 and CE2) which are respectively coupled to PE1 and PE2. Similarly, the customer site 140 includes a CE device 185 (labeled CE3) attached to PE3. For ease of illustration and description, the customer sites 120 and 140 participate in the same VPN (VPN1), and network nodes in these customer sites can communicate with one another through the provider network 110. Specifically, the provider network may create one or more MPLS tunnels, such as LSP1 or LSP2, that provide logical data paths between the customer sites 120 and 140.

Suppose a source node (S) 150 in the customer site 140 addresses a data packet 105 to a destination node (D) 155 in the customer site 120. The source node forwards the packet to its local customer edge device CE3, which in turn transfers the packet across domain boundaries to the provider edge device PE3. PE3 then determines an appropriate LSP over which to forward the packet through the provider network 110 to the customer site 120 containing the packet's addressed destination node 155. The provider edge device PE3 may associate the received packet 105 with a LSP based on the packet's contained destination IP address. For purposes of discussion, assume the packet 105 is routed from PE3 to PE1 via LSP 1, as shown in bold. The packet is received by the provider edge device PE1 at the tail-end of the LSP1 and the packet is then forwarded over the PE1-CE1 link to CE1 in the customer site 120. CE1 receives the packet and forwards it to the destination node 155.

Problems arise in the conventional MPLS/VPN architecture when a node or link failure prevents data communications over a P-PE data link. For example, suppose that the P1-PE1 link fails as denoted by a dotted "X." After identifying the failure within the provider network 110, PE3 may know by way of IGP convergence (or BGP session failure with PE1) that it has lost reachability to the IP addresses previously advertised by CE devices in the customer site 120 via PE1. Eventually, the routing change is distributed throughout the provider network 110 and each PE device updates its local routing information to converge on the new network topology, i.e., without the failed P1-PE1 data link.

The conventional latency required for the PE devices to converge on the new network topology, i.e., without the P1-PE1 link, is often overly time consuming, e.g., on the order of seconds, and causes a number of significant problems. For instance, data packets are often "dropped" (i.e., discarded) at the edge of the provider network while the network is in the process of converging. For example, in response to the P1-PE1 link failing, data packets 105 addressed to the destination node 155 will be dropped by P1 until the network converges on an alternate data path, e.g., LSP2, for those packets. For selected types of network traffic data flows, such as voice-over-IP (VoIP) and multimedia data flows, this temporary loss of data at PE1 may significantly degrade the utility of the overall data transfer or may cause the data flow to time-out and stop completely.

It is therefore generally desirable for MPLS/VPN networks to achieve faster convergence times, e.g., sub-second convergence times, in response to PE node failures or P-PE link failures. The MPLS/VPN networks should quickly converge on the new network topology with minimal data loss at the edge of the network.

SUMMARY OF THE INVENTION

The present invention overcomes the disadvantages of the prior art by providing a novel fast reroute (FRR) technique for quickly and efficiently rerouting selected types of network traffic in response to a node or link failure at the edge of a computer network. According to the technique, the network includes first and second edge devices that function as "FRR mates," such that network traffic originally destined for one FRR mate may be quickly rerouted to the other without having to wait for conventional network convergence. When an edge device receives rerouted packets originally destined for its FRR mate, the device responds by forwarding only those rerouted packets matching the selected traffic types; rerouted packets that do not match the selected traffic types are dropped or otherwise discarded. The first and second edge devices may be statically configured as FRR mates, e.g., by a network administrator, or they may be configured to automatically detect their compatibility as FRR mates.

Illustratively, a network device coupled to the first edge device may determine that the first edge device has failed or is otherwise inaccessible, e.g., due to a failed data link. In response, the network device incorporates a predetermined label value into data packets addressed to the first edge device, and then reroutes the data packets to the first edge device's FRR mate, e.g., the second edge device. The predetermined label value indicates that the packets were originally destined for the first edge device, but have been rerouted to the second edge device.

The second edge device receives the rerouted packets and identifies them as being rerouted based on their contained predetermined label value. The second edge device is configured to forward only those rerouted packets corresponding to selected types of network traffic, such as network traffic formatted according to the selected network-level or application-level protocols, or data flows destined for selected subnetworks and/or VPNs; other rerouted data packets are dropped at the second edge device. In the preferred embodiment, the second edge device analyzes VPN label values stored in the rerouted data packets in order to determine whether the packets correspond to any of the selected types of network traffic. Since the rerouted packets were originally destined for the first edge device, their VPN labels were allocated by the first edge device. Accordingly, unlike previous implementations, the second edge device is preferably configured to render inter-domain forwarding decisions based on at least some VPN label values allocated by the first edge device.

Advantageously, the present invention provides a novel technique that FRR-protects selected types of network traffic, such as VoIP and multimedia data flows, which may be particularly sensitive to data loss due to node or link failures at the edge of the computer network. The inventive technique is not limited to MPLS/VPN network architectures and may be deployed at the edge of networks implementing various topologies and protocols. The invention is not limited to any particular hardware platform or set of software capabilities.

BRIEF DESCRIPTION OF THE DRAWINGS

The above and further advantages of the invention may be better understood by referring to the following description in conjunction with the accompanying drawings in which like reference numerals indicate identically or functionally similar elements, of which:

FIG. 5 is a schematic block diagram of an exemplary label-forwarding table that may be stored in the exemplary provider device of FIG. 4;

FIG. 7 is a schematic block diagram of an exemplary primary-label table that advantageously may be employed in accordance with the illustrative embodiment;

FIG. 11 is a schematic block diagram of an exemplary VRF table that may be stored in the exemplary provider edge device of FIG. 10;

DETAILED DESCRIPTION OF ILLUSTRATIVE EMBODIMENTS

In accordance with an illustrative embodiment, a computer network includes first and second provider edge (PE) devices that function as "FRR mates," such that network traffic originally destined for one FRR mate may be quickly rerouted to the other without having to wait for conventional network convergence. When a PE device receives rerouted packets originally destined for its FRR mate, the PE device responds by forwarding only those rerouted packets matching selected traffic types; rerouted packets that do not match the selected traffic types are dropped or otherwise discarded. The selected traffic types may include, among other things, network traffic formatted according to selected network-level or application-level protocols, or data flows destined for selected subnetworks and/or VPNS. The first and second PE devices may be statically configured as FRR mates, e.g., by a network administrator, or they may be configured to automatically detect their compatibility as FRR mates.

Figure 1:
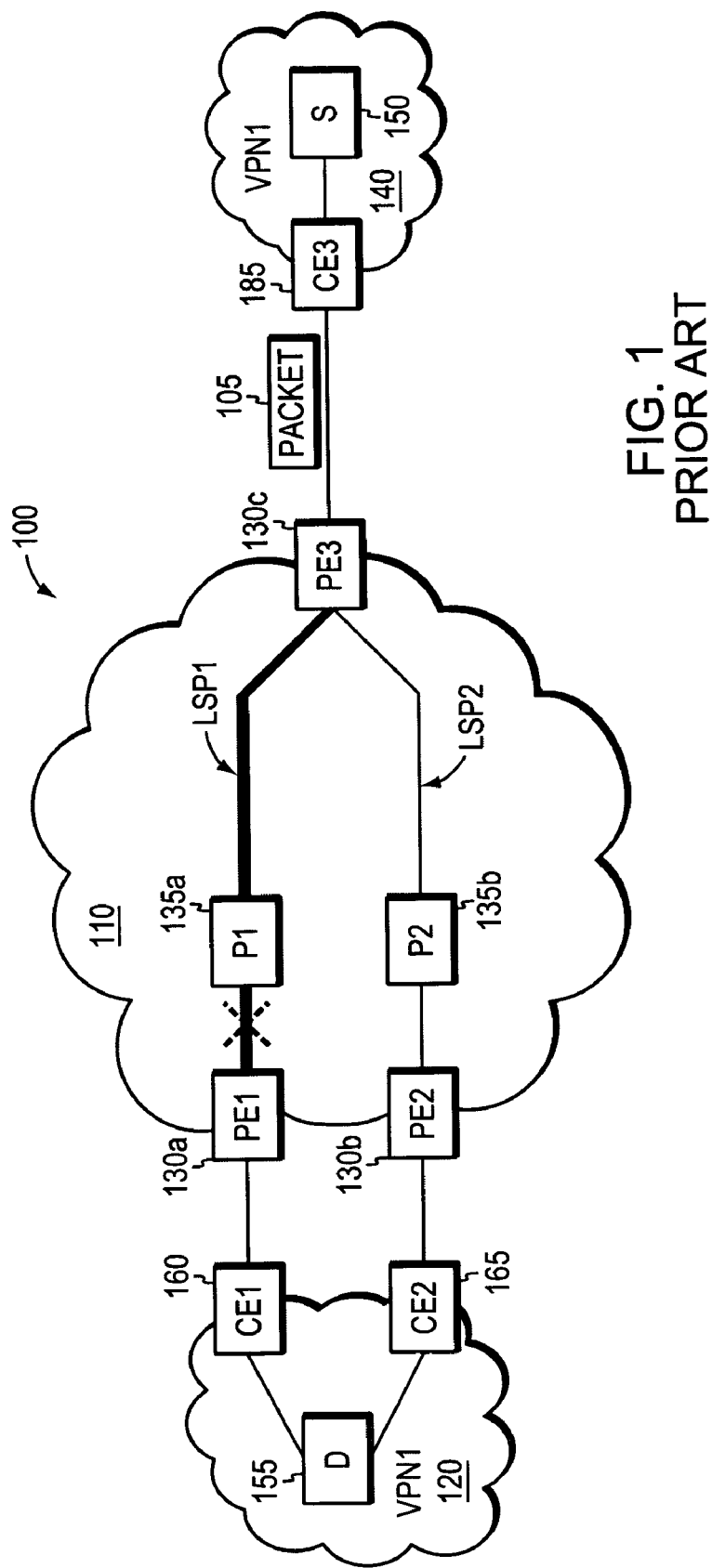
FIG. 1, previously described, is a schematic block diagram of an exemplary MPLS/VPN network topology.
Figure 2:
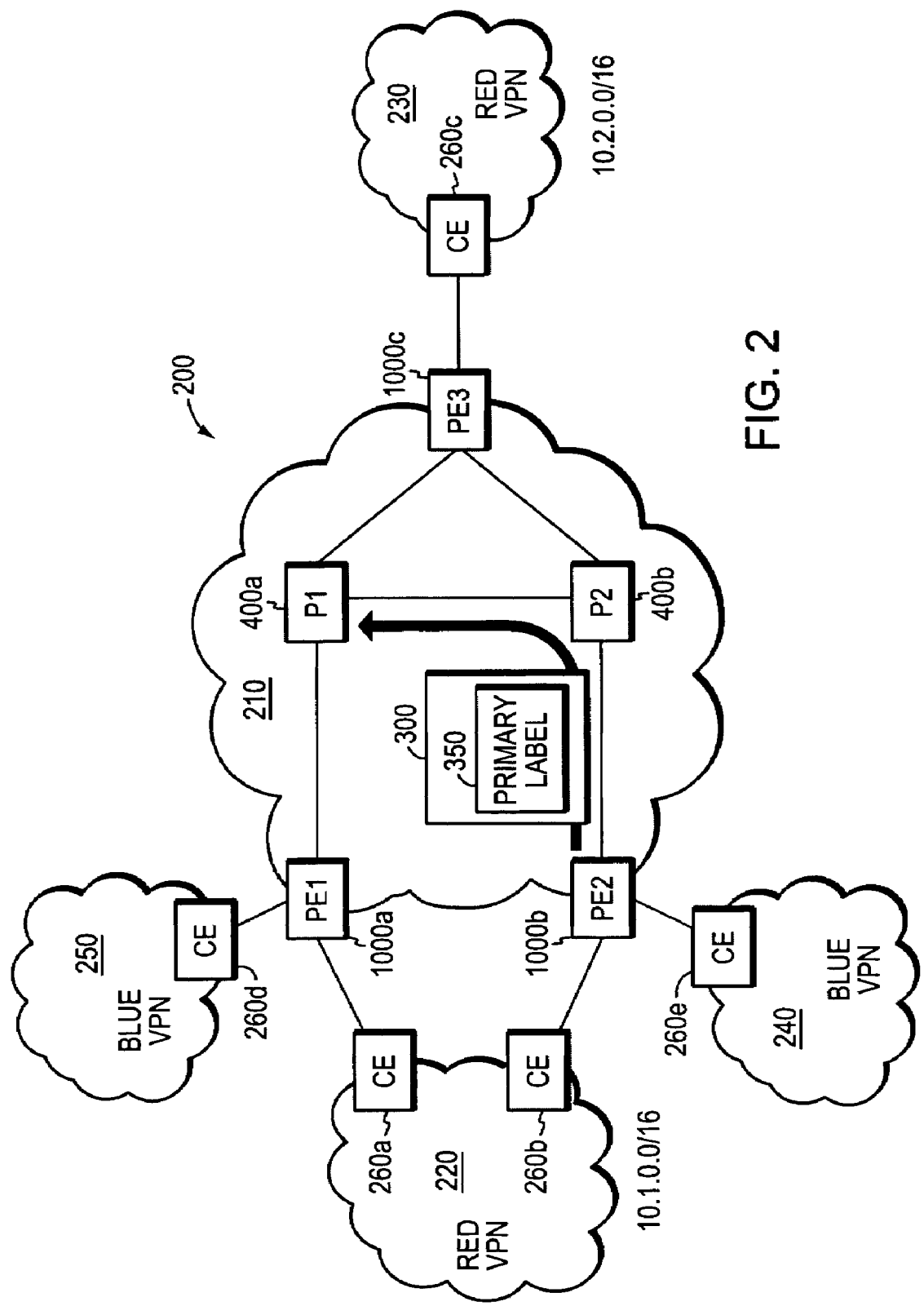
FIG. 2 is a schematic block diagram of an exemplary MPLS/VPN network topology in which an illustrative embodiment of the invention may be deployed. Those skilled in the art will appreciate that the network topology of FIG. 2 is merely representative and that the inventive technique may be employed in other network topologies as well.

FIG. 2 illustrates an exemplary computer network 200 employing an illustrative embodiment of the invention. The network 200 includes a high-bandwidth "backbone" provider network 210 having a plurality of PE devices 1000 coupled to customer edge (CE) devices 260 located in neighboring customer sites. For instance, as shown, the illustrative the provider edge device PE1 1000a is coupled to CE devices 260a and 260d in the customer sites 220 and 250, the provider edge device PE2 1000b is coupled to CE devices 260b and 260e in the customer sites 220 and 240, and the provider edge device PE3 1000c is coupled to the CE device 260c in the customer site 230. The provider network 210 is preferably configured as a MPLS-VPN network in accordance with the above-incorporated publication RFC 2547.

Each customer site that is coupled to the provider network 210 may participate in at least one VPN. For purposes of illustration and discussion, network nodes in the customer sites 220 and 230 are assumed to participate in a "Red" VPN, whereas nodes in the customer sites 240 and 250 participate in a "Blue" VPN. The provider network 210 may be used to establish label switched paths (LSP) that effectuate communications between customer sites participating in the same VPN. Specifically, LSPs may be established among the PE devices 1000a-c to transmit Red-VPN data between the customer sites 220 and 230; similarly, a different set of LSPs may be established, e.g., between the PE devices 1000a and 1000b, to communicate Blue-VPN data.

PE devices may function as FRR mates if they are configured to forward selected types of network traffic to the same customer site. For example, because the provider network 210 is multi-homed to the customer site 220 through the provider edge devices PE1 and PE2, the devices PE1 and PE2 may be configured as FRR mates for forwarding Red-VPN traffic to the customer site 220. That is, if either PE1 or PE2 fails or is otherwise incapable of forwarding data across routing-domain boundaries, then traffic intended for the inaccessible device PE1 or PE2 may be rerouted to its FRR mate, which provides an alternate path for forwarding Red-VPN traffic to the customer site 220.

Often, FRR mates consist of "primary" and "backup" PE devices that are coupled to a common customer site. The primary PE device is typically the preferred edge device for forwarding data from the provider network to the customer site. For instance, in FIG. 2 suppose that PE1 and PE2 are FRR mates, such that PE1 is the primary PE device for forwarding Red-VPN traffic to the customer site 220, and PE2 is the corresponding backup PE device. In this case, the provider network 210 may include separate LSPs for forwarding Red-VPN traffic to the primary and backup devices PE1 and PE2: a first LSP may be established as a preferred route for transporting Red-VPN traffic from PE3 to the primary device PE1 (e.g., PE3-P1-PE1) and a second LSP may be established as a less-preferred route for transporting Red-VPN traffic from PE3 to the backup device PE2 (e.g., PE3-P2-PE2).

In accordance with the illustrative embodiment, the backup PE device may advertise a predetermined "primary" label value 350 to each network device (P and PE device) that is directly attached to the primary PE device. Thereafter, if any of the network devices attached to the primary PE device detects that the primary PE device has failed or has otherwise become unavailable, that network device incorporates the advertised primary-label value 350 into data packets originally addressed to the primary PE device. Then, rather than forwarding the packets to the primary PE device, the network device instead reroutes the packets to the backup PE device. The backup PE device receives the rerouted packets and determines that they have been rerouted since they contain the primary-label value. Further to the illustrative embodiment, the backup PE device is configured to forward only those rerouted packets corresponding to selected types of network traffic, such as Red-VPN traffic. Other rerouted packets that do not correspond to the selected types of network traffic are dropped or otherwise discarded.

By way of example, consider the network topology depicted in the exemplary provider network 210, where the provider device P1 400a is attached to the provider edge devices PE1 and PE3, and the provider device P2 400b is attached to P1, PE2 and PE3. Again, it is assumed that PE1 and PE2 are configured as FRR mates, with primary device PE1 and backup device PE2. According to this illustrative embodiment, the backup PE device (PE2) may advertise a message 300 including the primary-label value 350 to each network device that is directly attached to the primary PE device (PE1). The backup PE device may determine which network devices are directly attached to the primary PE device based on network-topology information previously disseminated throughout the provider network 210, e.g., using a conventional interior gateway protocol, such as OSPF or IS-IS.

Here, only P1 is directly attached to the primary device PE1 in the provider network 210, so the message 300 is sent from backup device PE2 to P1, e.g., over the data path PE2-P2-P1 (shown in bold). Preferably, the message 300 is formatted according to the Label Distribution Protocol (LDP) and is communicated from PE2 to P1 over a directed LDP session, as is known in the art. The LDP protocol is generally described in more detail in Chapter 8 of the reference book entitled IP Switching and Routing Essentials, by Stephen Thomas, published 2002, which is hereby incorporated by reference as though fully set forth herein.

Figure 3:
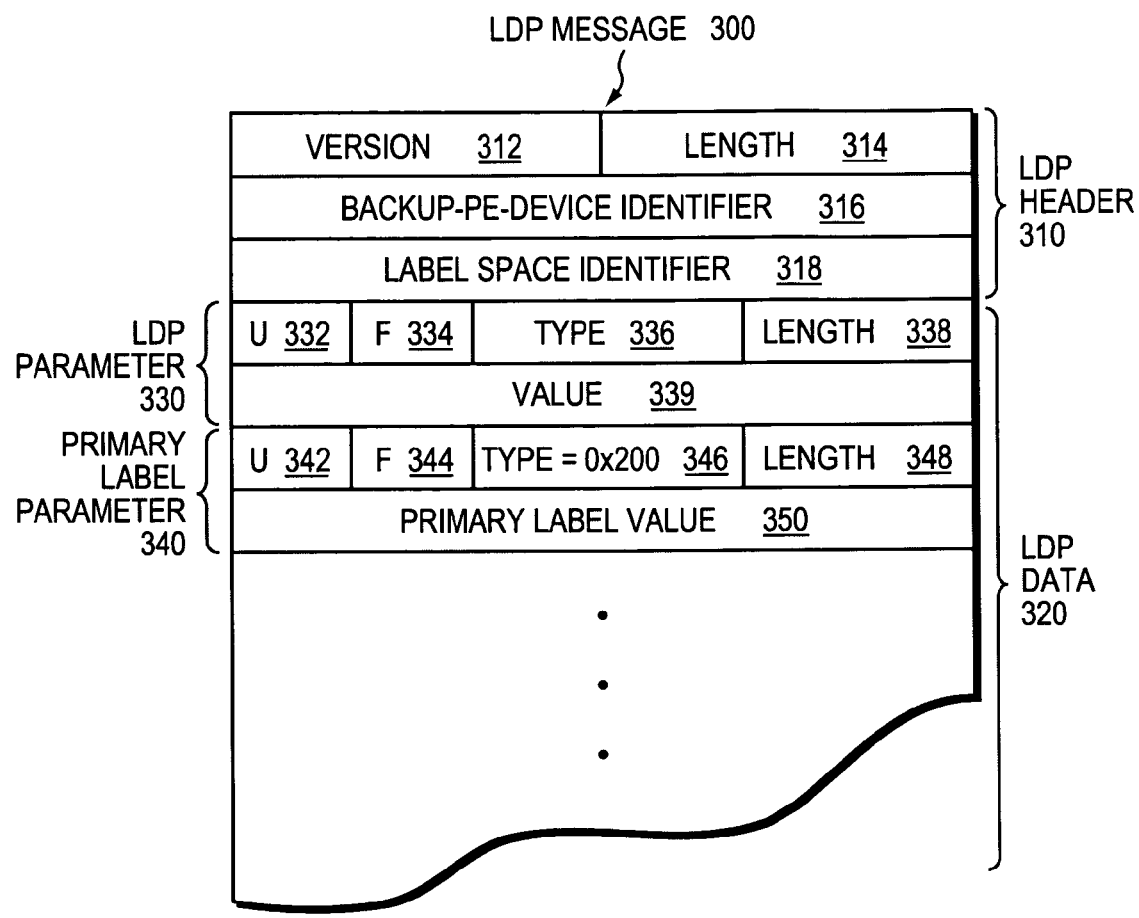
FIG. 3 is a schematic block diagram of an exemplary LDP message that may be used to advertise a primary-label value in accordance with the illustrative embodiment.

FIG. 3 illustrates an exemplary LDP message 300 that may be used to advertise the primary-label value 350. The message 300 includes a LDP header 310 and LDP data 320. The header 310 includes a version field 312, length field 314, backup-PE-device identifier field 316 and label-space identifier field 318. The version field 312 stores a value indicating which version of the LDP protocol was used to format the message 300. The length field 314 stores the length (in bytes) of the message 300, excluding the version and length fields 312 and 314. The backup-PE-device identifier field 316 stores a value, such as a loopback IP address, identifying which backup PE device advertised the LDP message 300. The label-space identifier field 318 stores a value corresponding to a particular set of IGP label values for which the contents of the LDP message 300 applies.

The data section 320 stores one or more LDP parameters 330, configured as type-length-value (TLV) tuples. Each parameter includes an unknown (U) flag 332, forward (F) flag 334, type field 336, length field 338 and value field 339. The U flag 332 stores a value indicating whether a notification should be returned to the sender of the LDP message 300 in the event that the parameter 330 contains an unknown type 336. The F flag 334 is valid only when the unknown flag 332 is set, and indicates whether the parameter 330 should be forwarded if it contains an unknown parameter type. The type field 336 stores a value indicating the type of data stored in the value field 339. The length field 338 stores the overall length (e.g., in bytes) of the LDP parameter 330.

The primary-label parameter 340 is one example of a LDP parameter that may be used to communicate the primary-label value 350. The primary-label parameter includes a U flag 342, F flag 344, type field 346, length field 348 and primary-label value 350. The U flag, F flag and length fields store values as previously described with reference to the above-noted LDP parameter 330. The type field stores a value, such as 0x200 (in hexadecimal), indicating that parameter 340 stores an IGP label value, i.e., the primary-label value 350.

Rerouting Data Packets Between FRR Mates

Hereinafter, assume that PE1 and PE2 are FRR mates in the provider network 210, and P1 is configured to reroute data packets originally addressed to the primary device PE1 to the backup device PE2, in the event that P1 detects that PE1 has failed or is otherwise inaccessible, e.g., due to a failed data link. Those skilled in the art will understand that this illustrative embodiment is only one exemplary network topology in which the inventive principles set forth herein may be deployed. The invention is generally applicable to any topology in which a pair of PE devices can function as FRR mates for selected types of network traffic.

Figure 4:
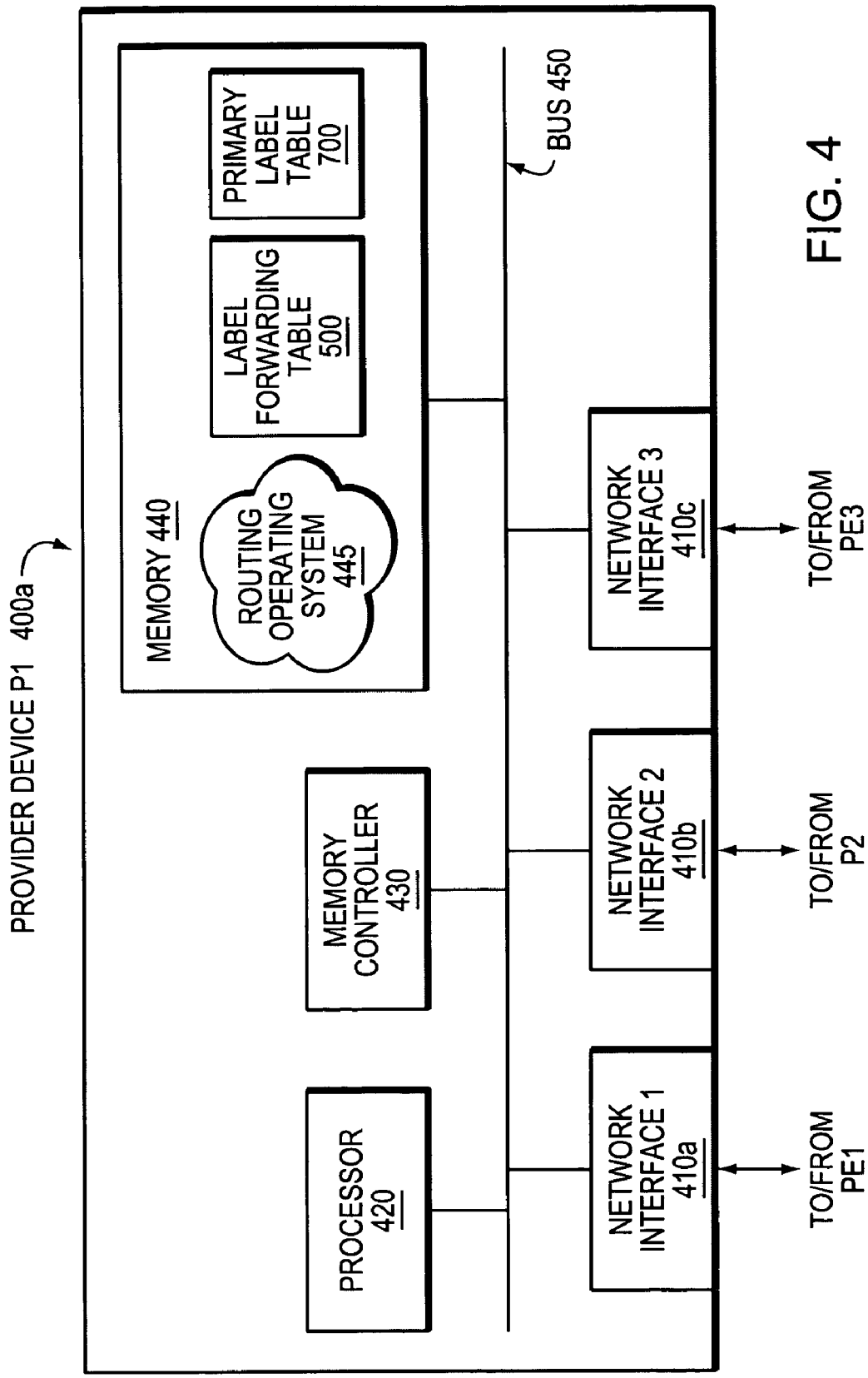
FIG. 4 is a schematic block diagram of an exemplary provider device that advantageously may be used in accordance with the illustrative embodiment.

FIG. 4 is a schematic block diagram of the illustrative provider device P1 400a that advantageously may be used in the illustrative embodiment of the invention. For ease of illustration and description, P1 is depicted on a generic hardware platform. However, in alternative embodiments, P1 may be implemented on other hardware platforms consistent with the teachings set forth herein. Accordingly, those skilled in the art will appreciate that the depicted provider device is merely exemplary and that the advantages of the present invention may be realized on a variety of different hardware platforms having various software capabilities.

The illustrative device P1 comprises one or more network interfaces 410, a processor 420, a memory controller 430 and a memory 440 interconnected by a system bus 450. Each network interface 410 may be a physical or logical interface that connects the P device with a neighboring node. For example, as shown, the network interface 410a is coupled to the provider edge device PE1 located in the customer site 220. The network interfaces 410b and 410c are respectively coupled to the devices P2 and PE3 in the provider network 210. Each network interface 410 may be adapted to transfer and acquire data packets over various transport media such as, e.g., Fast Ethernet (FE), Gigabit Ethernet (GE), wireless links, optical links, etc. Functionally, the interfaces 410 may be configured to communicate using various network communication protocols, including but not limited to Asynchronous Transfer Mode (ATM), Ethernet, frame relay (FR), multi-channel T3, synchronous optical network (SONET), Fibre Distributed Data Interface (FDDI), and so forth.

The memory 440 comprises a plurality of storage locations that are addressable by the processor 420 and the network interfaces 410 via the memory controller 430. The memory 440 preferably comprises a form of random access memory (RAM) that is generally cleared by a power cycle or other reboot operation (e.g., it is a "volatile" memory). For instance, the memory 440 may comprise dynamic RAM (DRAM) and/or synchronous DRAM (SDRAM) storage locations adapted to store program code and data structures accessible to the processor 420. It will be apparent to those skilled in the art that the memory 440 also may comprise other memory means, including various computer-readable media, for storing program instructions and data structures pertaining to the operation of P1. Further, those skilled in the art will appreciate that at least some portions of the memory 440 may be embodied as electromagnetic signals that are transmitted from a remote memory element to the illustrative P1 400a.

The memory 440 stores, among other things, computer-readable instructions for implementing a routing operating system 445 that functionally organizes the P device 400a by, e.g., invoking network operations in support of software processes and services executing on the processor 420. The IOS™ operating system by Cisco Systems Incorporated is one example of an operating system 445 that may be stored in the memory 440 and executed in accordance with the illustrative embodiments herein. The IOS operating system includes various routing services, such as conventional interior and exterior gateway protocols and the MPLS protocol.

The memory 440 is also configured to store, inter alia, a label-forwarding table 500 and primary-label table 700. The label-forwarding table 500 is a data structure that is configured to store IGP label information which may be used to forward data packets received by P1. When a data packet is received at a network interface 410, an IGP label value may be extracted from the packet and used to index an entry in the label-forwarding table 500. The indexed table entry identifies a new IGP label value to incorporate into the packet, as well as an appropriate "egress" network interface 410 over which the packet should be forwarded to its next hop in the provider network 210. In the event that the egress network interface 410 is coupled to a network device that is currently unavailable, e.g., due to a node or link failure, then the primary-label table 700 may be used to identify an alternative egress network interface over which the packet may be forwarded.

FIG. 5 illustrates an exemplary label-forwarding table 500 that may be stored in P1's memory 440 and used to render forwarding decisions in the provider network 210. The table 500 includes a plurality of entries 510, each of which is configured to store an ingress IGP label value 502, egress network interface 504, egress IGP label value 506 and other information 508. When establishing a new LSP in the provider network 210, the provider device P1 may allocate an ingress IGP label value 502 for inclusion in data packets transmitted from a network device located "upstream" along the LSP. P1 communicates the allocated IGP label value to the neighboring device, preferably using the LDP protocol. Thereafter, the neighboring device incorporates the IGP label value into data packets addressed to P1 along the newly-established LSP. Because P1 allocates different ingress IGP label values for different LSPs, P1 can examine a received packet's IGP label value to determine which upstream network device forwarded the packet. Moreover, P1 can use the packet's contained IGP label value as an index into the label-forwarding table 500 to locate a table entry 510 that identifies the packet's next-hop destination along its LSP.

The egress network interface 504 identifies a particular network interface 410 to forward a received data packet containing the IGP label value 502. The egress IGP label value 506 identifies an IGP label value that may be used to replace the received packet's ingress IGP label value 502 before the packet is forwarded over the egress network interface 504. The egress IGP label value 506 may not be necessary if the packet's next hop corresponds to a PE device that is configured to receive data packets in accordance with conventional penultimate hop popping (PHP). As known in the art, PHP-enabled PE devices are configured to receive data packets without IGP labels, thereby reducing the number of label-lookup operations that they perform. Those skilled in the art will appreciate that other information 508 also may be stored in the table entry 510, depending on the particular implementation of the provider device P1 400a.

Consider the exemplary table entries 510a and 510b in the label-forwarding table 500. According to table entry 510a, a data packet containing an ingress IGP label value equal to 57 is forwarded over the network interface 1 410a, e.g., coupled to PE1. The provider edge device PE1 is preferably a PHP-enabled, so an egress IGP label 506 is not necessary to replace the packet's ingress IGP label value 502. On the other hand, table entry 510b indicates that a data packet having an ingress IGP label equal to 72 is forwarded over the egress network interface 2 410b, e.g., coupled to P2. In this case, the ingress IGP label value equal to 72 is replaced with an egress IGP label value equal to 101 before the packet is forwarded to P2.

Figure 6:
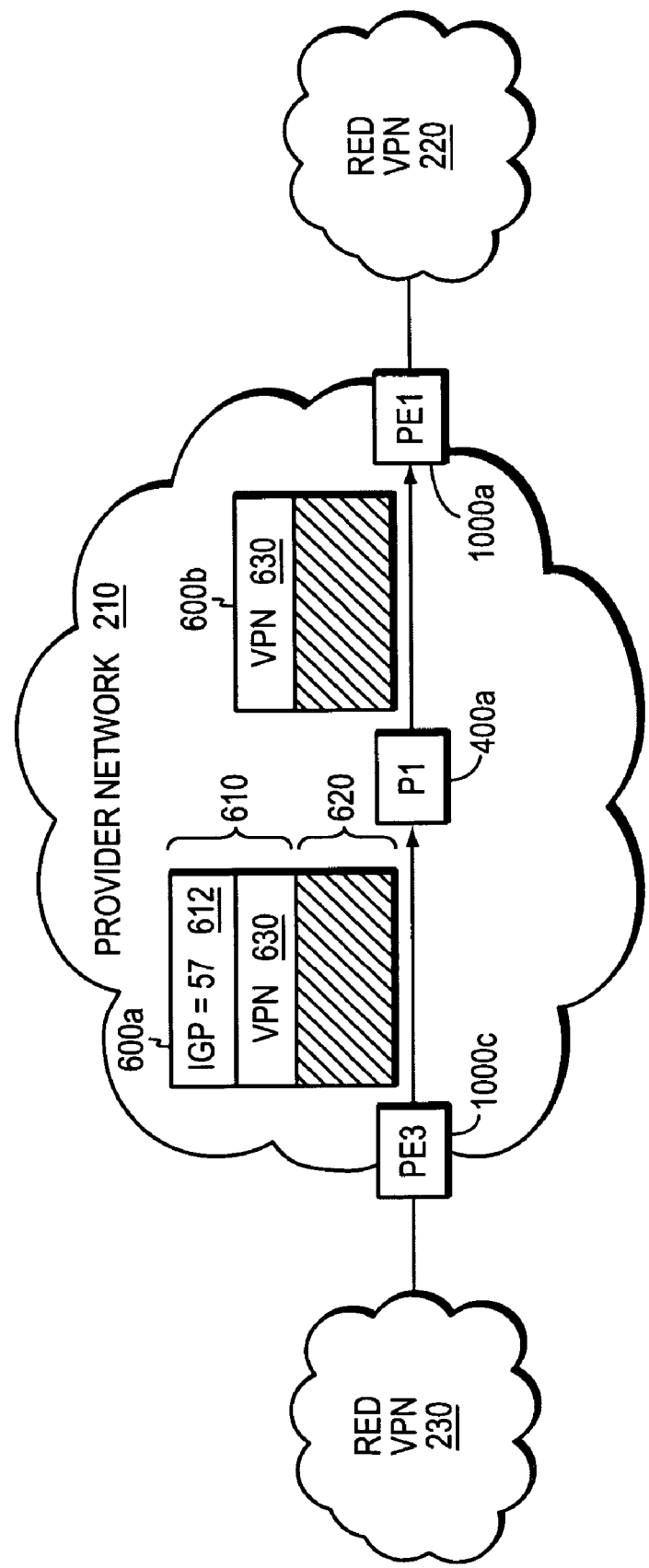
FIG. 6 is a schematic block diagram of a portion of the computer network of FIG. 2 in which an exemplary Red-VPN data packet may be forwarded over a "preferred" LSP in accordance with the illustrative embodiment.

FIG. 6 illustrates a portion of the computer network 200 in which an exemplary Red-VPN data packet 600 is forwarded to the primary device PE1 over a "preferred" LSP defined by the data path PE3-P1-PE1. The data packet includes, among other things, a label stack 610 and packet data 620. In this example, when the packet 600a is forwarded from PE3 to P1, the packet includes a two-level label stack having a "top" IGP label value 612 and a "bottom" VPN label 630. The IGP label value 612 identifies the packet's next hop along the LSP, whereas the VPN label value 630 identifies the packet's exit point from the provider network 210 after the packet has reached PE1 at the logical end of the LSP.

When P1 receives the data packet 600a, it extracts the packet's IGP label value 612 and uses the extracted IGP label value to index a matching table entry 510 in the label-forwarding table 500. More specifically, a matching table entry is identified if it stores an ingress IGP label value 502 equal to the packet's IGP label value 612. For example, as shown, the packet 600a contains an IGP label value equal to 57, which matches the ingress IGP label value 502 stored in the exemplary table entry 510a. Thus, according to the packet's matching table entry 510a, P1 should forward the packet 600b over the egress network interface 1 to the PHP-enabled provider edge device PE1.

FIG. 7 illustrates the exemplary primary-label table 700 that advantageously may be employed in the illustrative embodiment. As described above, when the illustrative provider device P1 receives a data packet, it extracts the packet's IGP label value 612 and uses the extracted IGP label value to locate a matching table entry 510 in the label-forwarding table 500. Then, based on the matching table entry 510, P1 determines an appropriate egress network interface 504 over which to forward the packet. If the routing operating system 445 executing in the provider device P1 determines that the egress network interface 504 is connected to a network device that has failed or is otherwise unavailable, then P1 searches its primary-label table 700 to determine whether there is an alternative egress network interface over which the packet may be forwarded.

The primary-label table 700 is a data structure that includes a plurality of entries 710 configured to store, inter alia, an egress network interface 702, backup-PE-device network interface 704, label stack 706 and other information 708. The egress network interface 702 corresponds to a network interface 410 that is directly attached to a primary PE device, such as PE1. The backup-PE-device network interface 704 identifies a network interface 410 over which a received packet can be rerouted toward a backup PE device in the event that the primary PE device attached to the egress network interface 702 has become unavailable, e.g., due to a failed node or data link. The label stack 706 stores a two-level label stack of IGP and primary label values that should be included in data packets that are rerouted to the backup-PE-device network interface 704. Those skilled in the art will appreciate that the table entry 710 also may include other information 708, depending on the particular implementation and configuration of the illustrative provider device P1.

As shown in the exemplary table entry 710, if P1's routing operating system 445 determines that the primary PE device (PE1) attached to the network interface 1 becomes unavailable, e.g., due to a node or link failure, then data packets normally forwarded to the primary PE device instead may be rerouted to the provider device P2 via the network interface 2 (see FIG. 4). The exemplary table entry 710 further indicates that a label stack having an IGP label value equal to 101 and a primary-label value equal to 7 should be inserted in the rerouted packets before they are sent to P2 over the network interface 2.

Figure 8:
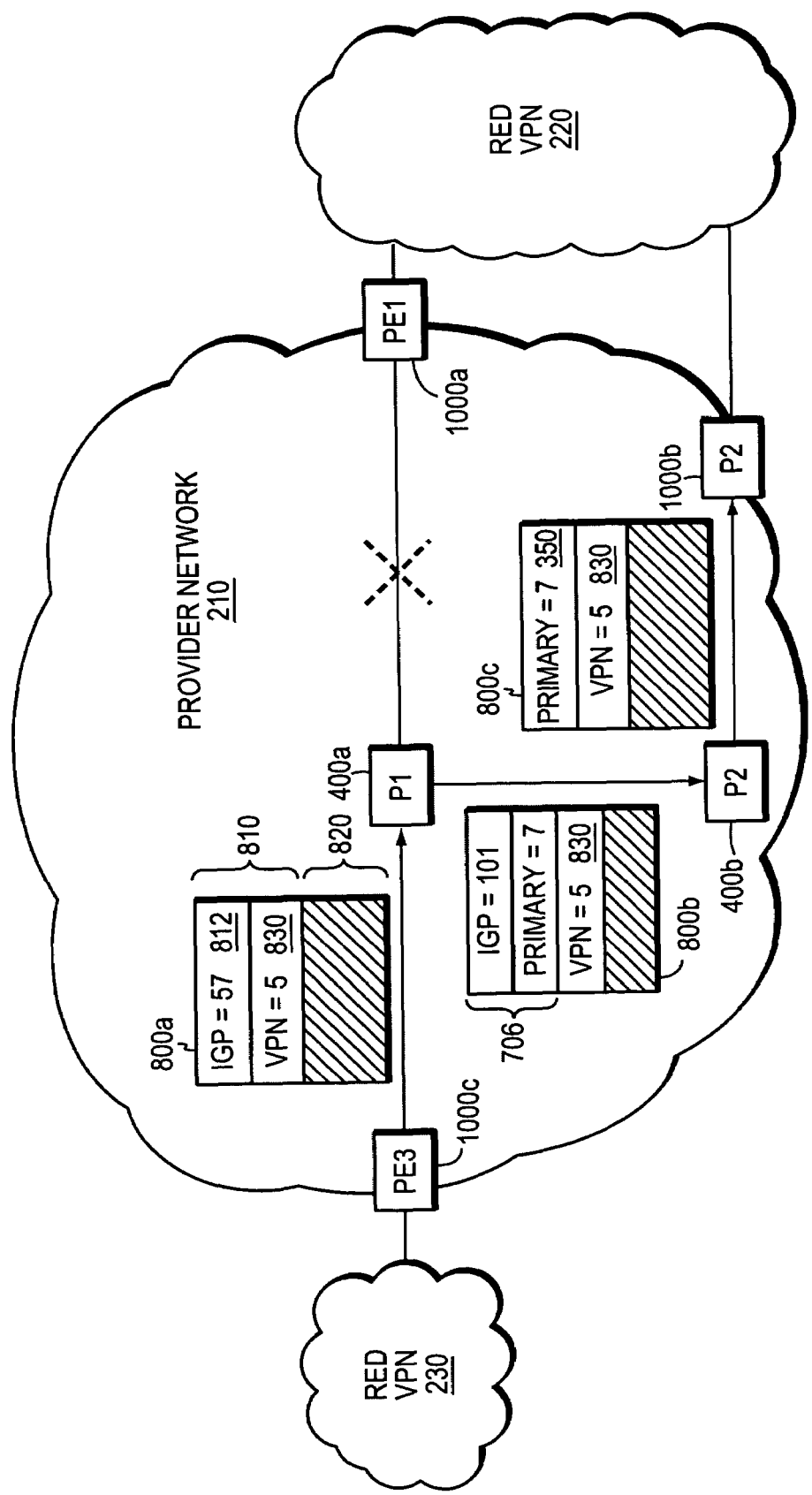
FIG. 8 is a schematic block diagram an exemplary data packet that may be processed by a provider device in accordance with the illustrative embodiment.

FIG. 8 illustrates an exemplary data packet 800 that may be processed by the illustrative provider device P1 in accordance with the illustrative embodiment. First, P1 receives the packet 800a from the provider edge device PE3. The received data packet 800a includes a label stack 810 and packet data 820. In particular, the label stack 810 is a two-level stack having a top IGP label value 812, e.g., equal to 57, and a bottom VPN label value 830, e.g., equal to 5. After receiving the packet 800a, P1 performs a label-lookup operation in its label-forwarding table 500. In this example, because the packet's IGP label value equals 57, the packet's matching table entry 510a indicates that the received packet 800a should be forwarded to the primary device PE1 over the network interface 1 410a.

Next, suppose that the primary device PE1 becomes inaccessible to the provider device P1, e.g., due to a node or link failure (as indicated by the dotted "X"). Accordingly, the received packet 800a cannot be forwarded over the egress network interface 504 stored in the packet's matching label-forwarding table entry 510a. In such a case, P1 performs a second lookup operation in its primary-label table 700 to determine whether there is an alternative egress network interface 704 over which the packet may be rerouted, e.g., to the backup device PE2. As shown in the exemplary table entry 710, when PE1 is unavailable over the egress network interface 1 410a, P1 may reroute data packets originally intended for PE1 to the provider device P2 via the network interface 2 410b. However, before sending the rerouted packet to P2, P1 replaces the received packet's IGP label 812 with the label stack 706 identified in the table entry 710. The resulting packet 800b is then forwarded to P2, which in turn removes the top-most IGP label and forwards the packet 800c to the PHP-enabled backup device PE2.

Figure 9:
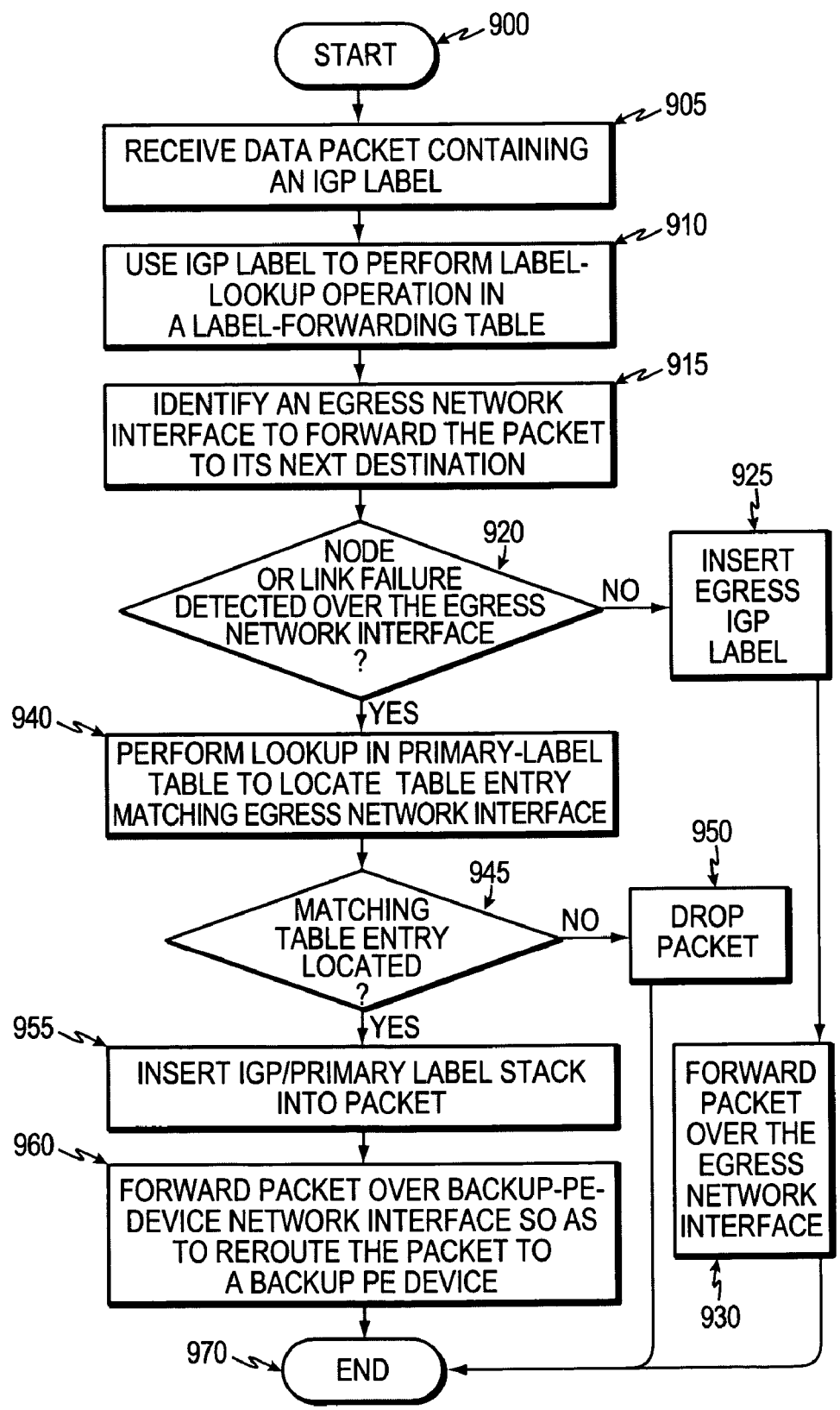
FIG. 9 is a flowchart illustrating a sequence of steps that may be performed by a provider device in accordance with the illustrative embodiment.

FIG. 9 illustrates a sequence of steps that may be performed by the illustrative provider device P1 in accordance with the illustrative embodiment. The sequence starts at step 900 and proceeds to step 905 where a data packet is received at P1. The received packet contains an IGP label value which is extracted from the packet and, at step 910, P1 uses the extracted IGP label value to perform a label-lookup operation in its label-forwarding table 500. A matching table entry 510 is located containing an ingress label value 502 equal to the packet's extracted IGP label value. At step 915, an egress network interface 504 is identified in the matching table entry 510. Then, at step 920, P1 determines whether a network device attached to the egress network interface 504 is currently inaccessible, e.g., due to a node or link failure. If not, then at step 925 the egress IGP label value 506 stored in the packet's matching table entry 510 is inserted into the received packet. Notably, if the egress network interface 504 is connected to a PHP-enabled PE device, then the egress IGP label may be unnecessary. At step 930, the packet is forwarded over the egress network interface 504 to its next-hop destination. The sequence ends at step 970.

If, at step 920, a node or link failure is detected over the egress network interface 504, then at step 940 P1 performs a lookup operation in its primary-label table 700 to locate a table entry 710 whose egress network interface 702 matches the egress network interface 504. At step 945, P1 determines whether such a matching table entry 710 can be found. If not, the sequence proceeds to step 950 where the received packet is dropped and the sequence ends at step 970. However, if at step 945 a matching table 710 is found, then at step 955 the label stack 706 stored in the table entry is inserted, e.g., prepended, into the received data packet. At step 960, the packet is forwarded over the backup-PE-device network interface 704 identified in the matching table entry 710 so as to reroute the packet to a backup PE device. The sequence ends at step 970.

Processing Rerouted Data Packets at a FRR Mate

Figure 10:
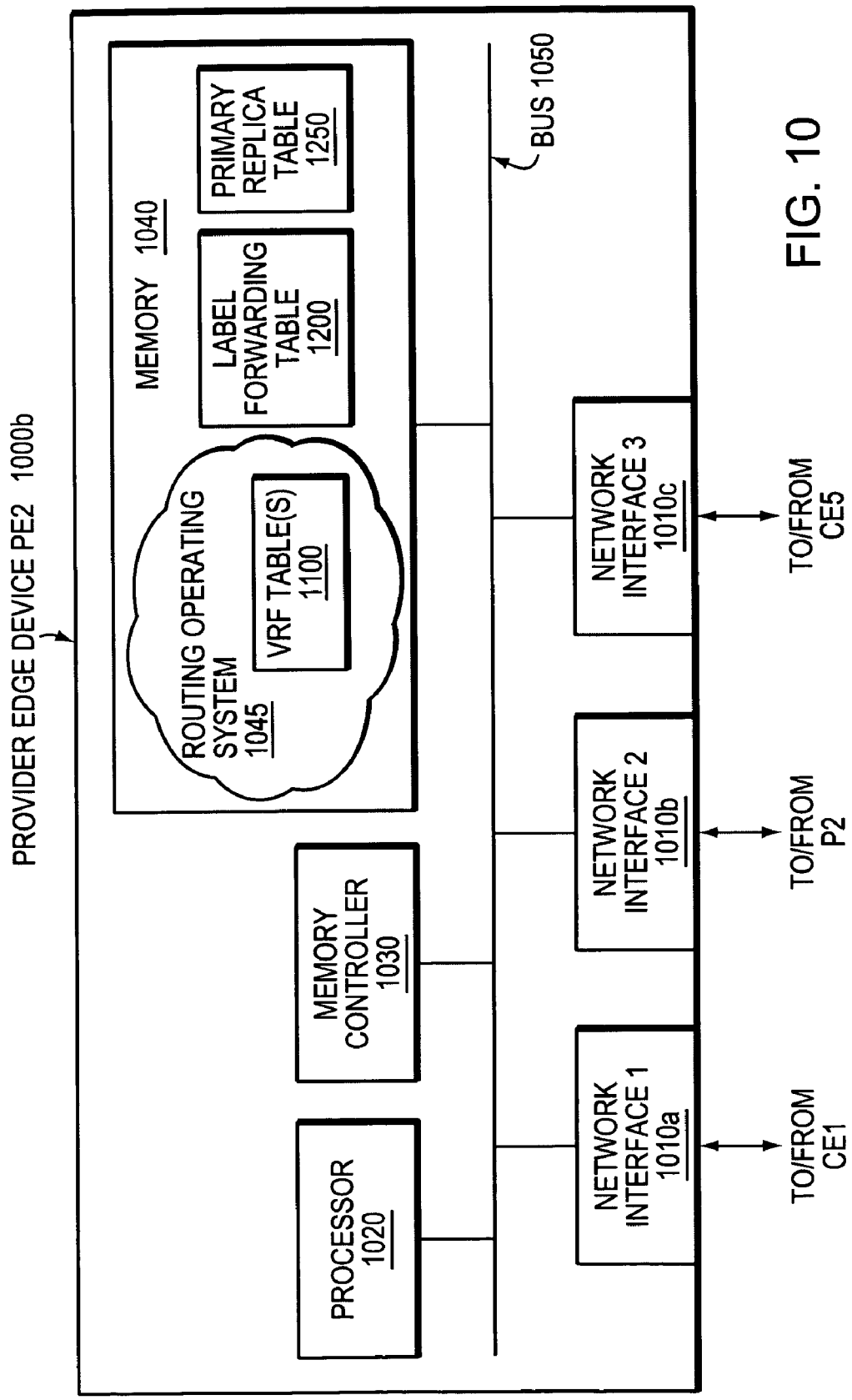
FIG. 10 is a schematic block diagram of an exemplary provider edge device that advantageously may be configured to function as a FRR mate in accordance with the illustrative embodiment.

FIG. 10 is a schematic block diagram of the illustrative provider edge device PE2 1000b that advantageously may be used as a FRR mate of the primary device PE1 in accordance with the illustrative embodiment. For purposes of illustration and description, PE2 is depicted on a generic hardware platform. However, in alternative embodiments, the illustrative backup device PE2 may be implemented on other hardware platforms consistent with the teachings set forth herein. Accordingly, those skilled in the art will appreciate that the depicted PE device is merely exemplary and that the advantages of the present invention may be realized on a variety of different hardware platforms having various software capabilities.

The illustrative backup device PE2 1000b comprises one or more network interfaces 1010, a processor 1020, a memory controller 1030 and a memory 1040 interconnected by a system bus 1050. Each network interface 1010 may be a physical or logical interface that connects the PE device with a neighboring node. For example, as shown, the network interface 1010a is coupled to the customer edge device CE1 located in the customer site 220, the network interface 1010b is coupled to the provider device P2, and the network interface 1010c is coupled to the customer edge device CE5 in the customer site 240. Each network interface may be adapted to transfer and acquire data packets to and from various transport media such as, e.g., Fast Ethernet, Gigabit Ethernet, wireless links, optical links, etc. Functionally, the interfaces 1010a-c may be configured to communicate using various network communication protocols, including but not limited to ATM, Ethernet, FR, multi-channel T3, SONET, FDDI, and so forth.

The memory 1040 comprises a plurality of storage locations that are addressable by the processor 1020 and the network interfaces 1010 via the memory controller 1030. The memory 1040 preferably comprises a form of RAM that is generally cleared by a power cycle or other reboot operation. For instance, the memory 1040 may comprise DRAM and/or SDRAM storage locations adapted to store program code and data structures accessible to the processor 1020. It will be apparent to those skilled in the art that the memory 1040 also may comprise other memory means, including various computer-readable media, for storing program instructions and data structures pertaining to the operation of the PE2. Further, those skilled in the art will appreciate that at least some portions of the memory 1040 may be embodied as electromagnetic signals that are transmitted from a remote memory element to the illustrative backup device PE2.

The memory 1040 stores, among other things, computer-readable instructions for implementing a routing operating system 1045 that functionally organizes PE2 by, e.g., invoking network operations in support of software processes and services executing on the processor 1020. The IOS™ operating system by Cisco Systems Incorporated is one example of an operating system 1045 that may be stored in the memory 1040 and executed in accordance with the illustrative embodiments herein. The IOS operating system includes various routing services, such as conventional interior and exterior gateway protocols and the MPLS protocol.

Preferably, the routing operating system 1045 is configured to manage one or more virtual routing and forwarding (VRF) tables 1100. Each VRF table stores routing and forwarding information for a different VPN that is accessible to PE2. For instance, as shown in FIG. 2, the illustrative device PE2 is coupled to the customer sites 220 and 240 that respectively participate in the Red and Blue VPNs. Accordingly, the operating system 1045 may include separate VRF tables 1100 for storing routing and forwarding information corresponding to the Red and Blue VPNs. In this manner, the routing operating system 1045 can separately manage routing and forwarding data for Red-VPN and Blue-VPN traffic transmitted and received at the network interfaces 1010.

The memory 1040 is also configured to store, inter alia, a label-forwarding table 1200 and primary-replica table 1250. The label-forwarding table 1200 is a data structure that is configured to store VPN label information which may be used to render inter-routing domain forwarding decisions for received data packets. When the illustrative provider edge device PE2 receives a data packet at one of its network interfaces 1010, the device may extract a VPN label value from the received packet and use the extracted VPN label to index an entry in the label-forwarding table 1200. The indexed table entry identifies a particular egress network interface 1010 over which the packet should be forwarded to a CE device in a neighboring customer site.

In accordance with the illustrative embodiment, PE2 may function as a backup PE device (i.e., FRR mate) for one or more primary PE devices in the provider network 210. For instance, in the exemplary computer network 200, PE2 may function as a backup PE device for Red-VPN traffic originally addressed to the primary device PE1. Thus, PE2 may receive data packets that were originally addressed to PE1, but were rerouted by P1 upon determining that PE1 failed or otherwise became inaccessible. PE2 receives the rerouted packets and identifies them as being rerouted based on their contained primary-label value 350. Further to the illustrative embodiment, PE2 is configured to forward only those rerouted packets corresponding to selected types of network traffic, such as network traffic formatted according to selected network-level or application-level protocols, or data flows destined for selected subnetworks and/or VPNs. To that end, the primary-replica table 1250 is a data structure that is configured to store label-forwarding information that enables PE2 to determine which rerouted data packets correspond to the selected types of network traffic.

In a preferred embodiment, the primary-replica table 1250 stores VPN label values corresponding to those rerouted packets that may continue to be rerouted by the backup device PE2. For example, the table 1250 may store VPN label values corresponding to Red-VPN network traffic, thereby ensuring that only rerouted data packets in the Red VPN are forwarded to the customer site 220. Notably, because the rerouted packets were originally destined for the primary device PE1, the rerouted packets contain VPN labels allocated by the primary device PE1. Accordingly, as described in more detail below, the backup device PE2's primary-replica table 1250 is preferably configured to store packet-forwarding information for the rerouted packets based on at least some VPN label values allocated by the primary device PE1.

FIG. 11 illustrates an exemplary VRF table 1100 that may be stored in the memory 1040 of the illustrative device PE2. As shown, the exemplary table 1100 is configured to store Red-VPN routing and forwarding information. For purposes of explanation, assume that the Red-VPN customer site 220 is allocated IP addresses in the subnetwork defined by the address prefix 10.1.0.0/16, and the Red-VPN customer site 230 is allocated IP addresses in the subnetwork defined by the prefix 10.2.0.0/16. The CE devices 260 in the Red-VPN customer sites 220 and 230 advertise their reachable address prefixes to the provider edge devices PE1, PE2 and PE3, e.g., using a conventional exterior gateway protocol, such as BGP.

When a provider edge device PE1, PE2 or PE3 receives ("learns") a reachable address prefix advertised by a CE device in a neighboring Red-VPN customer site 220 or 230, the PE device advertises the learned address prefix to the other fully-meshed PE devices 1000a-c in the provider network 210. As known in the art, the prefix may be advertised along with a conventional route target (RT) value to indicate that the learned prefix is associated with the Red VPN. The PE device that learned the prefix also may advertise, e.g., in a MP-BGP message, a VPN label value to associate with the address prefix. In this way, each fully-meshed PE device 1000a-c is made aware of the reachable address prefixes in the Red VPN and the prefixes' corresponding VPN label values. Further, since each learned Red-VPN address prefix is advertised to each of the PE devices 1000a-c, the PE devices can create consistent Red VRF tables 1100, i.e., containing the same reachability information.

The Red VRF table 1100 includes a plurality of entries 1110 which are configured to store an address prefix 1102, advertising-PE device 1104, VPN label value 1106 and other information 1108. The address prefix 1102 stores a prefix corresponding to a particular subnetwork that was advertised as being reachable in the Red VPN. The advertising-PE device 1104 identifies which PE device 1000a-c advertised the prefix 1102. The VPN label 1106 is allocated by the advertising-PE device 1104 and identifies a VPN label value that may be used to route Red-VPN traffic through the provider network 210 to the advertising PE device 1104. For instance, as shown, Red-VPN data packets addressed to PE1 may include a VPN label value equal to 5 to indicate that the packets should be forwarded to the customer site 220 (10.1.0.0./16). The other information 1108 may include other routing and forwarding information as known in the art. For instance, the other information may include route distinguisher (RD) or RT values associated with the prefixes 1102, as set forth in RFC 2547. Of course, those skilled in the art will understand that any arbitrary information may be stored in the field(s) 1108.

When PE2 receives an address prefix whose RT value matches the import filter of a local VRF that is enabled for PE-node protection in accordance with the illustrative embodiment, PE2 is preferably configured to determine whether the same address prefix was also advertised by a locally-attached CE device, i.e., directly attached to PE2. If so, then PE2 can conclude that PE2 and the remote PE device that advertised the prefix may be potential FRR mates for forwarding network traffic addressed to that prefix.

For example, consider the exemplary Red VRF table 1100 where PE2 learns the address prefix 10.1.0.0/16 from a locally-attached CE device and advertises this prefix to the other fully-meshed provider edge devices PE1 and PE3 along with an associated VPN label value equal to 9. In addition, the prefix 10.1.0.0/16 was also advertised as being reachable by the provider edge device PE1, which associated the prefix with a VPN label value equal to 5. Accordingly, because the prefix 10.1.0.0/16 was advertised as being reachable by both PE1 and PE2, each of these provider edge devices can identify the other as a possible FRR mate for Red-VPN traffic addressed to the subnetwork 10.1.0.0/16, i.e., based on the contents of their local Red-VPN tables 1100.

After identifying the primary edge device PE1 as a possible FRR mate for Red-VPN traffic addressed to 10.1.0.0/16, PE2 may allocate the predetermined primary-label value 350 and disseminate the primary-label value to each network device (P and PE device) that is directly attached to PE1. PE2 may determine which network devices are attached to PE1 based on network topology information previously distributed within the provider network 210, e.g., using a conventional IGP protocol such as OSPF or IS-IS. In the illustrative embodiment, only P1 is directly attached to PE1, so PE2 sends the primary-label value to P1. As noted with reference to FIGS. 7-8, P1 incorporates the primary-label value 350 into rerouted network traffic that was originally destined for PE1, in the event that P1 determines that PE1 is inaccessible.

The backup device PE2 is preferably configured to make forwarding decisions based on VPN label values allocated by the primary device PE1. To that end, the backup device PE2 may associate at least some VPN label values advertised by the primary device PE1 with equivalent VPN label values allocated locally by PE2. Referring again to the exemplary Red VRF table 1100, the primary device PE1 associated the address prefix 10.1.0.0/16 with a VPN label value equal to 5, and the backup device PE2 associated this same prefix with a locally-allocated VPN label value equal to 9. Thus, the backup device PE2 can determine that rerouted network traffic containing a VPN label value equal to 5 may be forwarded over the same network interface 1010 as non-rerouted traffic containing the locally-allocated VPN label value equal to 9.

As described in more detail below, PE2 may store mappings of primary-PE VPN label values and equivalent network interfaces in its primary-replica table 1250.

Figure 12:
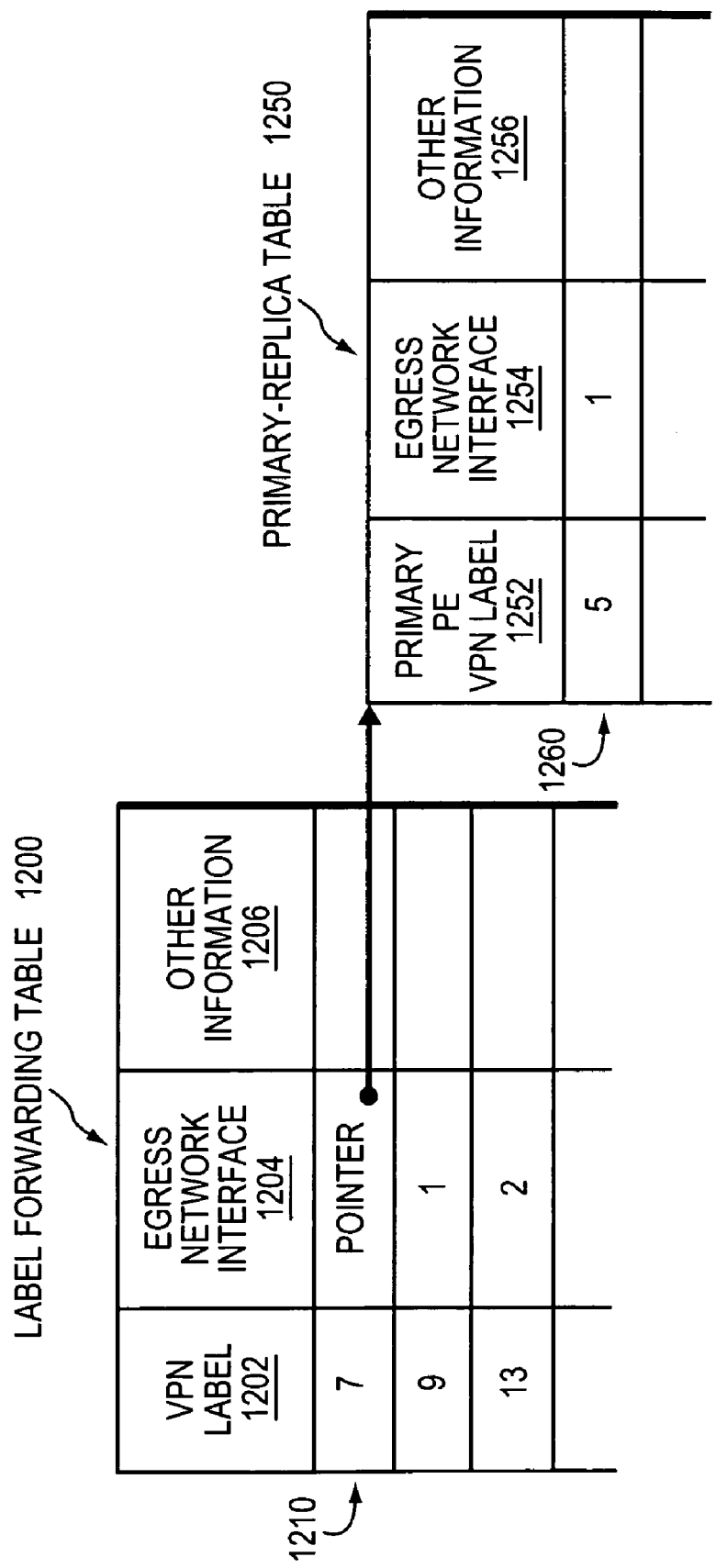
FIG. 12 is a schematic block diagram of an exemplary label-forwarding table and primary-replica table that may be stored employed by the provider edge device of FIG. 10 in accordance with the illustrative embodiment.

FIG. 12 illustrates the exemplary label-forwarding table 1200 and primary-replica table 1250 that may be stored in the memory 1040 of the illustrative provider edge device PE2. The label-forwarding table 1200 includes a plurality of entries 1210 configured to store, among other things, a VPN label value 1202, an egress network interface 1204, and other information 1206. In practice, a data packet is received by PE2 and the top-most label is extracted from the label stack transported by the received packet. Because PE2 is preferably a PHP-enabled device, the extracted label value is ordinarily a VPN label; however, for rerouted packets, the extracted label may be a primary-label value 350. The packet's extracted label value may be used to index a "matching" table entry 1210 in the table 1200. Specifically, the packet's matching table entry 1210 contains a VPN label value 1202 equal to the packet's extracted label value. The egress network interface 1204 stored in the matching table entry identifies a particular network interface 1010 over which the packet should be forwarded to reach its next-hop destination in a neighboring customer site.

According to the illustrative embodiment, if the received packet's extracted label value equals the predetermined primary-label value 350, e.g., equal to 7, then the packet's matching table entry 1210 stores a memory-address pointer in place of an egress network interface 1204. More particularly, the pointer 1204 references the memory location of the primary-replica table 1250, which is used to render forwarding decisions for rerouted packets containing the primary-label value. After locating the primary-replica table 1250, the backup device PE2 extracts a VPN label value from the rerouted data packet, and the extracted VPN label value is used to index a matching entry in the primary-replica table 1250.

Illustratively, the primary-replica table 1250 includes a plurality of entries 1260, each of which is configured to store a primary-PE VPN label value 1252, egress network interface 1254 and other information 1256. The primary-PE VPN label value 1252 stores a VPN label value that was allocated by a primary PE device, such as PE1. The egress network interface 1254 identifies a network interface 1010 over which the rerouted packet may be forwarded to its next-hop destination in a neighboring customer site. To determine the egress network interface 1254, the primary-PE VPN label value 1252 is first associated with an equivalent locally-allocated VPN label value. Then, PE2 determines the egress network interface 1204 that is used to forward network traffic containing the locally-allocated VPN label. The primary-PE VPN label value 1252 is then associated with an egress network interface 1254 corresponding to the same egress network interface 1204 that is used to forward network traffic containing the locally-allocated VPN label value.

For example, referring again to the exemplary Red VRF table 1100, the address prefix 10.1.0.0/16 is associated with a primary-PE VPN label value equal to 5, i.e., allocated by PE1, and the prefix 10.1.0.0/16 is also associated with PE2's locally-allocated VPN label value equal to 9. Since the label-forwarding table 1200 indicates that data packets containing a locally-allocated VPN label value equal to 9 should be forwarded over the egress network interface 1, PE2 can conclude that data packets containing the primary-PE VPN label value equal to 5 also should be forwarded over the egress network interface 1. Accordingly, the exemplary table entry 1260 in the primary-replica table 1250 indicates that rerouted network traffic containing a primary-PE VPN label value equal to 5 should be forwarded over the network interface 1, i.e., the same network interface over which non-rerouted data packets containing a VPN label value equal to 9 are forwarded.

Figure 13:
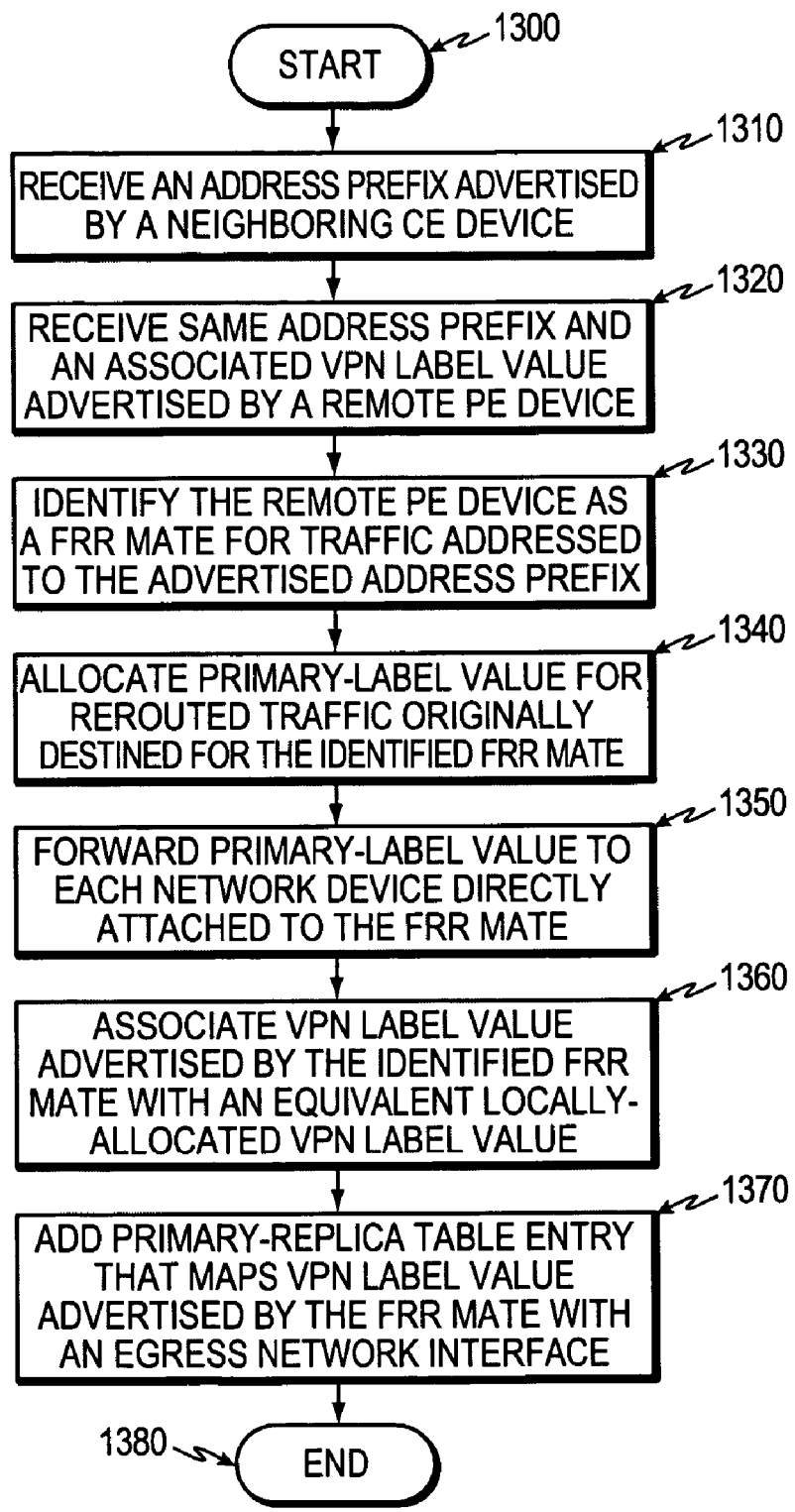
FIG. 13 is a flowchart illustrating a sequence of steps that may be performed by a provider edge device that is configured to dynamically identify its FRR mate for selected types of network traffic in accordance with the illustrative embodiment.

FIG. 13 illustrates a sequence of steps may be performed by a PE device that is configured to dynamically identify its FRR mate for selected types of network traffic. The sequence starts at step 1300 and proceeds to step 1310 where the PE device receives an address prefix advertised by a neighboring CE device. At step 320, the PE device receives the same address prefix and an associated VPN label value advertised by a remote PE device. Notably, the steps 1310 and 1320 may be performed in any order. Because the remote PE device advertised the same address prefix that was learned locally from a neighboring CE device, the remote PE device is identified as a FRR mate for network traffic addressed to that prefix, at step 1330.

After identifying the remote PE device as a FRR mate, at step 1340 the PE device allocates a primary-label value 350 that may be incorporated into rerouted network traffic originally destined for the identified FRR mate. At step 1350, the primary-label value is forwarded to each network device that is directly attached to the FRR mate. At step 1360, the PE device associates the VPN label value advertised by the identified FRR mate with an equivalent locally-allocated VPN label value. At step 1370, the FRR mate's advertised VPN label value may be stored in a primary-replica table entry 1260 which maps the FRR mate's VPN label value with the egress network interface that is used for forwarding non-rerouted traffic containing the locally-allocated VPN label value. The sequence ends at step 1380.

Figure 14:
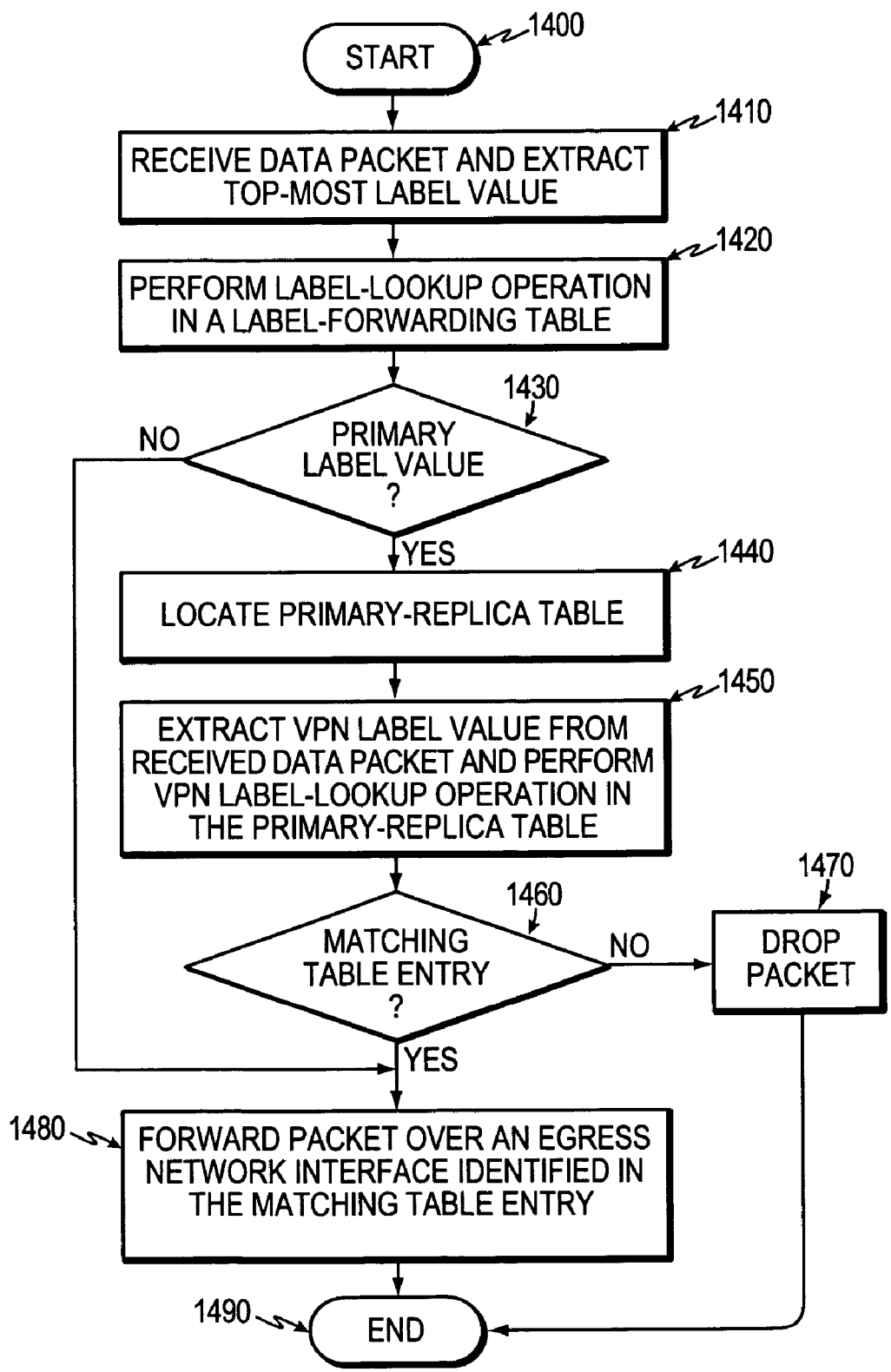
FIG. 14 is a flowchart illustrating a sequence of steps that may be performed by a FRR mate that processes data packets in accordance with the illustrative embodiment.

FIG. 14 illustrates a sequence of steps may be performed by a backup PE device that processes data packets in accordance with the illustrative embodiment. The sequence begins at step 1400 and proceeds to step 1410 where the backup PE device receives a data packet and extracts a top-most label value from the packet's label stack. At step 1420, the backup PE device uses the extracted label value to perform a label-lookup operation in its label-forwarding table 1200. Next, at step 1430, the backup PE device determines whether the extracted label value corresponds to a primary-label value 350. For instance, the extracted label value may match a table entry 1210 in which an egress network interface 1204 is replaced with a memory-address pointer that references the location of a primary-replica table 1250. If it is determined that the received packet does not contain the primary-label value, the sequence advances to step 1480.

If the received packet contains the primary-label value 350, the backup PE device references the contents of its primary-replica table 1250 to determine whether the packet corresponds to a selected type of network traffic that may be forwarded, at step 1440. Specifically, at step 1450, the backup PE device extracts a VPN label value from the received data packet and performs a VPN label-lookup operation to locate a matching table entry 1260 in the primary-replica table 1250. The matching table entry contains a primary-PE VPN label value 1252 equal to the packet's extracted VPN label value and further identifies an egress network interface 1254 over which the packet may be forwarded. If no matching table entry 1260 can be located in the primary-replica table at step 1460, then at step 1470 the packet is dropped or otherwise discarded by the backup PE device and the sequence ends at step 1490. Otherwise, at step 1480, the packet's VPN label is removed and the packet is forwarded over the egress network interface identified in the matching primary-replica table entry. The sequence ends at step 1490.

Advantageously, the present invention provides a novel technique that FRR-protects selected types of network traffic, such as VoIP and multimedia data flows, which may be particularly sensitive to data loss due to node or link failures at the edge of the computer network. The inventive technique is not limited to MPLS/VPN network architectures and may be deployed at the edge of networks implementing various topologies and protocols. The invention is not limited to any particular hardware platform or set of software capabilities.

The foregoing has been a detailed description of illustrative embodiments of the invention. Various modifications and additions can be made without departing from the spirit and scope of the invention. For example, although the primary and backup PE devices described herein are PHP-enabled devices, those skilled in the art will appreciate that the inventive principles herein apply equally to non-PHP enabled implementations. Further, while the inventive technique has been illustratively described with respect to MPLS/VPN networks, it is also expressly contemplated that the invention may be deployed in other types of networks and subnetworks, such as autonomous systems, broadcast domains, routing areas, etc., that implement various network communication protocols. Although the illustrative embodiments described herein assume a one-to-one correspondence between customer sites and VPNs, those skilled in the art will understand that the technique also may be deployed in networks in which customer sites are permitted to participate in more than one VPN.

It is expressly contemplated that the teachings of this invention can be implemented as software, including a computer-readable medium having program instructions executing on a computer, hardware, firmware, or a combination thereof. For instance, the exemplary P and PE devices 400 and 1000 may include one or more processors, some of which may reside on the network interfaces or on line cards containing the network interfaces. Further, the illustrative memories 440 and 1040 may be distributed among a plurality of different memory elements, including both local and remote memory elements relative to the exemplary P and PE devices. In general, the inventive technique may be implemented in various combinations of hardware and/or software. Accordingly, this description is meant to be taken only by way of example and not to otherwise limit the scope of the invention.

What is claimed is:

1. A method for rerouting selected types of network traffic in a computer network, the method comprising:

detecting a node or link failure at a first edge device in the computer network, the first edge device coupling the computer network to a neighboring site;

incorporating, in response to detecting the node or link failure at the first edge device, a predetermined interior gateway protocol (IGP) label value into a data packet addressed to the first edge device, the predetermined IGP label value indicating that the packet is being rerouted to a second edge device, the second edge device coupling the computer network to the neighboring site;

after the incorporating, rerouting the data packet addressed to the first edge device to the second edge device in the computer network;

determining, at the second edge device, whether the rerouted data packet corresponds to at least one of the selected types of network traffic; and forwarding the rerouted packet at the second edge device, in response to determining that the rerouted data packet corresponds to at least one of the selected types of network traffic.

2. The method of claim 1, further comprising:
dropping the rerouted data packet at the second edge device, in response to determining that the rerouted packet does not correspond to at least one of the selected types of network traffic.

3. The method of claim 1, further comprising:
detecting, at the second edge device, the predetermined IGP label value in the rerouted data packet.

4. The method of claim 1, further comprising:
disseminating the predetermined IGP label value from the second edge device to each network device directly attached to the first edge device in the computer network.

5. The method of claim 4, wherein the predetermined IGP label value is disseminated in a Label Distribution Protocol (LDP) message.

6. The method of claim 1, wherein the step of determining whether the rerouted packet corresponds to at least one of the selected types of network traffic further comprises:
locating a virtual private network (VPN) label value in the rerouted data packet, the VPN label value having been allocated by the first edge device; and
determining, at the second edge device, whether the rerouted data packet may be forwarded based on the value of the located VPN label value.

7. The method of claim 6, wherein the step of determining whether the rerouted data packet may be forwarded further comprises:
searching a primary-replica table based on the value of the VPN label located in the rerouted data packet.

8. A network device configured to reroute selected types of network traffic in a computer network, the network device comprising:
a processor;
a network interface adapted to receive a data packet from the computer network;
a memory adapted to store instructions which are executable by the processor, the instructions instructing the processor to perform the steps of:
determining whether the received data packet contains a predetermined interior gateway protocol (IGP) label value, the predetermined IGP label value indicating that the data packet has been rerouted to the network device by another network device in the computer network in response to detection of a node or link failure;
determining, in response to determining that the received data packet contains the predetermined IGP label value, whether the received data packet corresponds to a selected type of network traffic; and
forwarding the received data packet to its next-hop destination only if the data packet is determined to correspond to a selected type of network traffic.

9. The network device of claim 8, wherein the memory is further adapted to store a label-forwarding table containing label-forwarding information used for rendering next-hop forwarding determinations for data packets received at the network interface.

10. The network device of claim 9, wherein the memory is further adapted to store instructions for performing the step of:
determining whether the received data packet contains the predetermined IGP label value based on the result of a label-lookup operation in the label-forwarding table.

11. The network device of claim 8, wherein the memory is further adapted to store instructions for performing the steps of:
extracting, in response to determining that the received data packet contains the predetermined IGP label value, a virtual private network (VPN) label value from the received data packet, the VPN label having been allocated by a different network device in the computer network;
determining whether the received data packet corresponds to a selected type of network traffic based on the value of the extracted VPN label value; and
determining, in response to determining that the received data packet corresponds to a selected type of network traffic, a next-hop forwarding determination for the received data packet based on the value of the extracted VPN label value.

12. A network device configured to reroute network traffic in a computer network, the network device comprising:
a processor;
a network interface adapted to receive a data packet from the computer network;
a memory adapted to store instructions which are executable by the processor, the instructions instructing the processor to perform the steps of:
determining whether the received data packet is addressed to a neighboring edge device in the computer network;
determining, in response to determining that the received data packet is addressed to the neighboring edge device, whether the neighboring edge device is unavailable; and
incorporating, in response to determining that the neighboring edge device is unavailable, a predetermined interior gateway protocol (IGP) label value into the received data packet before the received data packet is rerouted, the predetermined IGP label value indicating that the received data packet will be rerouted to an edge device configured to function as a fast reroute (FRR) mate for the unavailable neighboring network device.

13. The network device of claim 12, wherein the memory is further adapted to store instructions for performing the step of:
forwarding, in response to incorporating the predetermined IGP label value into the received data packet, the received data packet to the ERR mate.

14. A computer network for rerouting selected types of network traffic, the computer network comprising:
means for detecting a node or link failure at a first edge device in the computer network that couples the computer network to a neighboring site;
means for incorporating, in response to detection of the node or link failure at the first edge device, a predetermined interior gateway protocol (IGP) label value into the data packet addressed to the first edge device, the predetermined IGP label value indicating that the packet is being rerouted to a second edge device that couples the computer network to the neighboring site;
means for rerouting the data packet addressed to the first edge device to the second edge device in the computer network after incorporation of the IGP label value;
means for determining, at the second edge device, whether the rerouted data packet corresponds to at least one of the selected types of network traffic; and means for forwarding the rerouted packet at the second edge device, in response to determining that the rerouted data packet corresponds to at least one of the selected types of network traffic.

15. The computer network of claim 14, further comprising: means for dropping the rerouted data packet at the second edge device, in response to determining that the rerouted packet does not correspond to at least one of the selected types of network traffic.

16. The computer network of claim 14, further comprising: means for detecting, at the second edge device, the predetermined IGP label value in the rerouted data packet.

17. The computer network of claim 14, further comprising: means for disseminating the predetermined IGP label value from the second edge device to each network device directly attached to the first edge device in the computer network.

18. The computer network of claim 14, wherein the means for determining whether the rerouted packet corresponds to at least one of the selected types of network traffic further comprises:
means for locating a virtual private network (VPN) label value in the rerouted data packet, the VPN label value having been allocated by the first edge device; and
means for determining, at the second edge device, whether the rerouted data packet may be forwarded based on the value of the located VPN label value.

19. A computer-readable medium storing instructions for execution on a processor for the practice of a method of rerouting selected types of network traffic in a computer network, the method comprising:

detecting a node or link failure at a first edge device in the computer network that couples the computer network to a neighboring site;

incorporating, in response to detecting a node or link failure at the first edge device, a predetermined interior gateway protocol (IGP) label value into a data packet addressed to the first edge device, the predetermined IGP label value indicating that the packet is being rerouted to a second edge device that couples the computer network to the neighboring site;

after the incorporating, rerouting the data packet addressed to the first edge device to the second edge device in the computer network;

determining, at the second edge device, whether the rerouted data packet corresponds to at least one of the selected types of network traffic; and forwarding the rerouted packet at the second edge device, in response to determining that the rerouted data packet corresponds to at least one of the selected types of network traffic.

\* \* \* \* \*

UNITED STATES PATENT AND TRADEMARK OFFICE
CERTIFICATE OF CORRECTION

PATENT NO. : 7,693,047 B2  Page 1 of 1
APPLICATION NO. : 11/287801
DATED : April 6, 2010
INVENTOR(S) : Jim Guichard It is certified that error appears in the above-identified patent and that said Letters Patent is hereby corrected as shown below:

Col. 4, Line 25, please amend as shown:
 ("next hop") to forward the [[is]] packet. Typically, an IGP label Col. 8, Line 37, please amend as shown:
 works and/or [[VPNS.]] VPNs. The first and second PE devices may be Col 19, Line 10, please amend as shown:
 CE device. At step [[320,]] 1320, the PE device receives the same Col. 22, Line 48, please amend as shown:
 received data packet to the [[ERR]] FRR mate.

Signed and Sealed this

Third Day of August, 2010

David J. Kappos
*Director of the United States Patent and Trademark Office*